US009472797B2

(12) United States Patent
Han et al.

(10) Patent No.: US 9,472,797 B2
(45) Date of Patent: Oct. 18, 2016

(54) BATTERY PACK

(75) Inventors: Jungyeop Han, Yongin-si (KR);
Seungsoo Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 468 days.

(21) Appl. No.: 13/446,973

(22) Filed: Apr. 13, 2012

(65) Prior Publication Data

US 2012/0301747 A1    Nov. 29, 2012

Related U.S. Application Data

(60) Provisional application No. 61/489,948, filed on May 25, 2011.

(51) Int. Cl.
| | |
|---|---|
| *H01M 2/10* | (2006.01) |
| *H01M 2/00* | (2006.01) |
| *H01M 2/20* | (2006.01) |
| *H01M 2/34* | (2006.01) |
| *H01M 10/647* | (2014.01) |

(Continued)

(52) U.S. Cl.
CPC ........... *H01M 2/206* (2013.01); *H01M 2/1005* (2013.01); *H01M 2/1077* (2013.01); *H01M 2/34* (2013.01); *H01M 10/613* (2015.04); *H01M 10/647* (2015.04); *H01M 10/658* (2015.04); *H01M 10/6566* (2015.04); *G01V 5/107* (2013.01)

(58) Field of Classification Search
CPC ........... H01M 2/1005; H01M 1/1077; H01M 2/206; H01M 10/5004; H01M 2/5032; H01M 2/5073; H01M 2/5087; H01M 2/34; H01M 10/425; H01M 2/1077; H01M 10/658; H01M 10/613; H01M 10/6566; H01M 10/647

USPC ............................................................ 429/7
See application file for complete search history.

(56) References Cited

U.S. PATENT DOCUMENTS

| | | | | |
|---|---|---|---|---|
| 7,248,471 B2* | 7/2007 | Wabiszczewicz | ............ | 361/694 |
| 2002/0180405 A1* | 12/2002 | Batson | ................. | H02J 7/0047 |
| | | | | 320/128 |

(Continued)

FOREIGN PATENT DOCUMENTS

| | | |
|---|---|---|
| JP | 2009-277420 A | 11/2009 |
| KR | 2006-0039377 A | 5/2006 |

(Continued)

OTHER PUBLICATIONS

Machine English Translation of Ikeda JP 2009-277420.*

(Continued)

*Primary Examiner* — Milton I Cano
*Assistant Examiner* — Michael Dignan
(74) *Attorney, Agent, or Firm* — Knobbe Martens Olson & Bear LLP

(57) ABSTRACT

The battery pack includes: a battery cell including a cell tab; a housing configured to accommodate the battery cell; a middle cover configured to close the housing in a state where the cell tab extends outward through the middle cover; a bus bar electrically connected to the cell tab extending outward through the middle cover; a sensing circuit board disposed on the bus bar and electrically connected to the bus bar; an isolation plate coupled to the middle cover to cover the bus bar and the sensing circuit board; and a battery management system disposed on the isolation plate and electrically connected to the sensing circuit board.

16 Claims, 24 Drawing Sheets

(51) Int. Cl.
*H01M 10/6566* (2014.01)
*H01M 10/613* (2014.01)
*H01M 10/658* (2014.01)
*G01V 5/10* (2006.01)

(56) References Cited

U.S. PATENT DOCUMENTS

| | | |
|---|---|---|
| 2006/0091891 A1 | 5/2006 | Woo et al. |
| 2008/0124617 A1* | 5/2008 | Bjork .................... H01M 2/204 429/90 |
| 2009/0208836 A1* | 8/2009 | Fuhr et al. .................... 429/158 |
| 2009/0305116 A1* | 12/2009 | Yang et al. ..................... 429/61 |
| 2009/0325043 A1 | 12/2009 | Yoon et al. |
| 2010/0124693 A1* | 5/2010 | Kosugi et al. .................. 429/92 |
| 2011/0135970 A1* | 6/2011 | Han et al. ......................... 429/7 |
| 2011/0151314 A1* | 6/2011 | Ogawa .......................... 429/158 |
| 2012/0009462 A1* | 1/2012 | Barter et al. .................. 429/159 |
| 2012/0231324 A1* | 9/2012 | Brisbane ....................... 429/152 |

FOREIGN PATENT DOCUMENTS

| | | | |
|---|---|---|---|
| KR | 2006-0073383 A | 6/2006 | |
| KR | 2007-0110565 A | 11/2007 | |
| KR | 2007-0112489 A | 11/2007 | |
| KR | 2009-0000292 A | 1/2009 | |
| KR | 2009-0082717 A | 7/2009 | |
| WO | WO 2009/124316 | * 10/2009 | ............... H02J 7/00 |
| WO | WO 2010/124562 | * 11/2010 | ............. H01M 2/00 |

OTHER PUBLICATIONS

Notice of Allowance dated Nov. 28, 2013 for corresponding KR Application No. 10-2012-0047651.

* cited by examiner

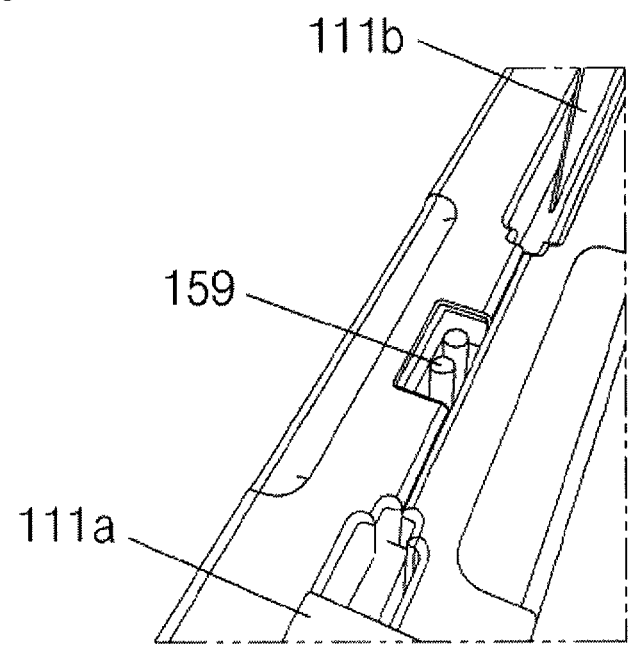

BATTERY PACK

CROSS-REFERENCE TO RELATED APPLICATIONS

This application claims the benefit of U.S. Provisional Patent Application No. 61/489,948 filed May 25, 2011, which is hereby incorporated in its entirety by reference herein.

BACKGROUND OF THE INVENTION

1. Field of the Invention

Embodiments relate to a battery pack.

2. Description of the Related Art

In general, a battery pack includes a plurality of battery cells, a battery management system (or a battery monitoring system) electrically connected to the battery cells to control or monitor the battery cells, and a housing in which the battery cells and the battery management system are accommodated.

Information such as voltages and temperatures of the battery cells is transmitted to the battery management system through connection lines. Therefore, if the number of the battery cells increases, the number of the connection lines also increases to connect the battery cells and the battery management system to transmit information such as voltages and temperatures of the battery cells to the battery management system.

Therefore, in the related art, if the number of battery cells increases, more connection lines are necessary to transmit information such as voltages and temperatures, thereby resulting in a complicated line connection structure. In addition, the possibility of line connection errors increases in a battery pack assembling process, and it is difficult to maintain and manage a battery pack.

SUMMARY

An aspect of the present invention provides a battery pack that has a simpler line connection structure and can be simply assembled for reducing line connection errors and maintenance efforts.

Another aspect of the present invention provides a battery pack to which a cooling medium such as air can be easily supplied.

Another aspect of the present invention provides a battery pack in which bus bars can be easily connected to a sensing circuit.

According to at least one of embodiments, a battery pack includes: a housing having an opening; a plurality of batteries mounted within the housing so that an upper surface of the plurality of batteries are positioned proximate the opening, wherein each of the plurality of batteries include at least one tab positioned adjacent the upper surface of the battery; a cover that is positioned on the housing so as to be adjacent the opening; a plurality of bus bars electrically coupled to the at least one tab of the batteries; a sensing circuit board disposed on the plurality of bus bars so that the sensing circuit board receives electrical signals from each of the plurality of batteries. The battery pack may further include an isolation plate that is positioned on the cover wherein the isolation plate covers at least some of the bus bars to electrically insulate at least some of the bus bars. The battery pack may further include a battery management system disposed on the isolation plate and electrically connected to the sensing circuit board.

The housing may be rectangular in shape defining a four sided receptacle and the plurality of batteries may be planar in shape and may be arranged in the four sided receptacle so as to extend substantially parallel to each other between a first and a second side of the housing. The first and the second side of the housing may include an air flow opening so as to allow air to flow between the substantially parallel arranged plurality of batteries. The at least two of the sides of the housing extending substantially parallel to the plurality of substantially parallel planar batteries may include fixing openings, wherein each of the plurality of batteries may include fixing openings, and wherein the fixing openings of the housing and the batteries may be aligned so as to receive at least one fixing rod to retain the plurality of batteries in the housing.

The plurality of batteries may include a substantially planar battery cell, a heat shield mounted adjacent a first side of the substantially planar battery cell, and first and second frame members mounted so that the substantially planar battery cell and the heat shield may be interposed between the first and second frame members.

The cover may include a plurality of penetration holes and a plurality of supports, wherein the at least one tab of the batteries may extend through a penetration hole and may be positioned adjacent a support. The at least one tab on each of the plurality of batteries may include a first and a second tab that may extend in a first and a second direction and wherein the plurality of batteries may be arranged in the housing so that at least one of the first tabs and the second tabs of adjacent batteries overlap adjacent at least one of the plurality of supports. The bus bars may be positioned on the at least one tab of the plurality of batteries so that the at least one tab and the bus bar may be positioned adjacent the supports. The at least one tabs, the plurality of bus bars and the supports may be arranged in two parallel columns separated by a center section of the cover. The plurality of bus bars may extend into the center section of the cover and wherein the sensing circuit board may be mounted in the center section of the cover. The cover may include a penetration opening formed in the center section of the cover and wherein the sensing circuit board may include a penetration opening formed in the sensing circuit board to permit air to flow through the penetration openings into the housing to cool the plurality of batteries. The battery pack may further include an isolation plate that may be positioned on the cover wherein the isolation plate may cover at least some of the bus bars to electrically insulate at least some of the bus bars and wherein the isolation plate may include protrusions that may extend into the penetration openings of the cover. The sensing circuit board may include a conductive pattern formed on a surface of the sensing circuit board facing the bus bar to electrically connect the bus bar to the sensing circuit board.

The battery pack may further include two electrodes that may be adjacent the opening of the housing and wherein the battery pack may further include a top cover that may be positioned over the housing so as to cover the battery pack while leaving the electrodes exposed.

The battery pack may further include at least one handle part connected to the housing so as to permit lifting of the battery pack via the at least one handle part.

The at least one support may include a metal bush configured to receive a fixing member to couple the support to at least one bus bar and at least one tab.

According to an embodiment, since states of the battery cells such as voltages and temperatures are transmitted to the battery management system through the sensing circuit board, the line connection structure and assembling process of the battery pack can be simpler. Therefore, erroneous assembling of the battery pack can be reduced, and maintenance of the battery pack can be more easily carried out.

According to another embodiment, since the penetration holes are formed in the middle cover covering the battery cells, the sensing circuit board, and the isolation plate, a cooling medium can be more easily supplied to the battery cell.

According to another embodiment, electric connection between the sensing circuit board and the bus bars can be more easily made by using the fixing members such as bolts.

BRIEF DESCRIPTION OF THE DRAWINGS

FIG. 2C is an enlarged view illustrating portion 2c of FIG. 2B.

DETAILED DESCRIPTION OF THE PREFERRED EMBODIMENT

Figure 1A:
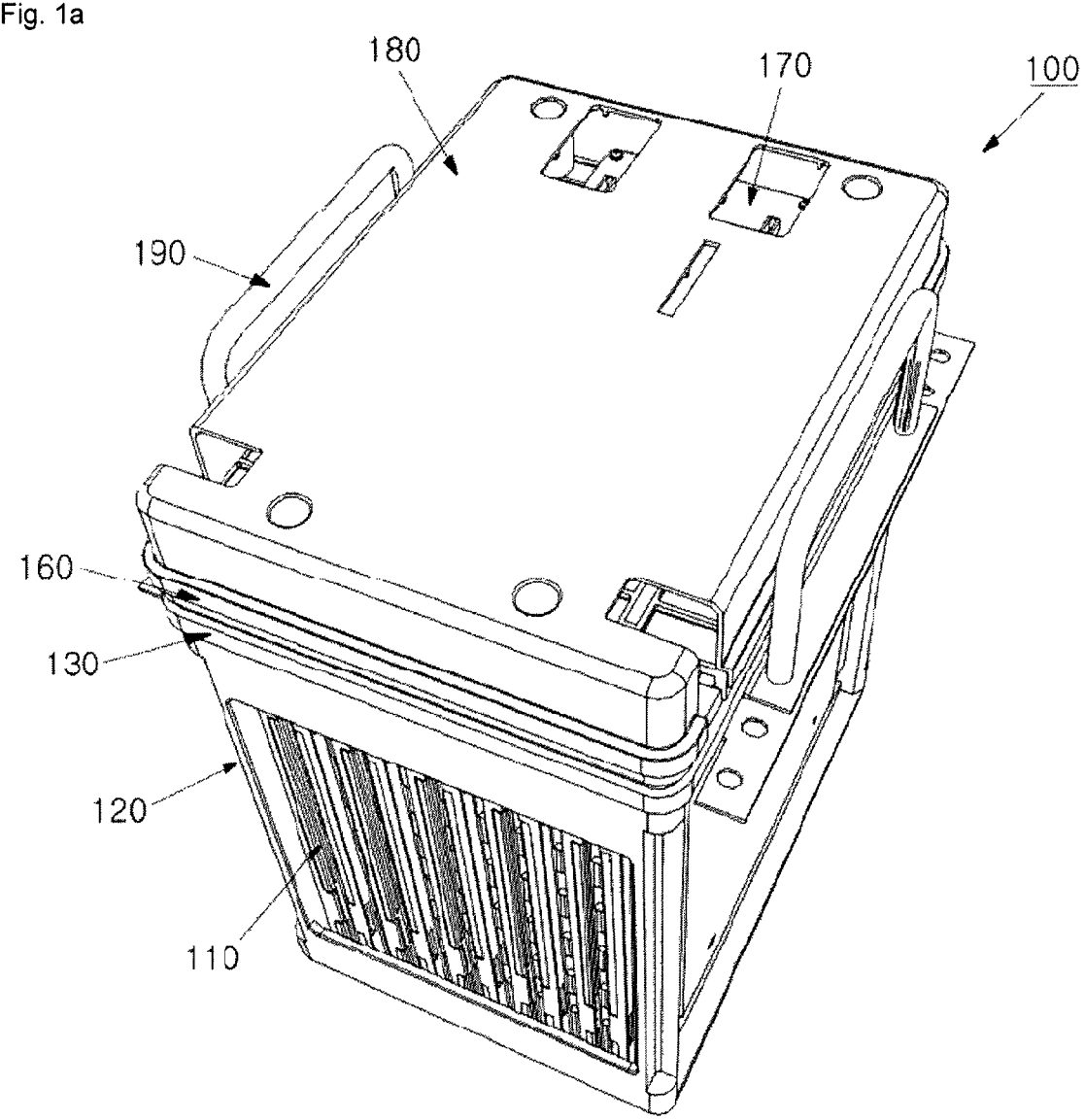
FIGS. 1A through 1E are a perspective view, a front view, a side view, a plan view, and a bottom view illustrating a battery pack according to an embodiment.
Figure 1B:
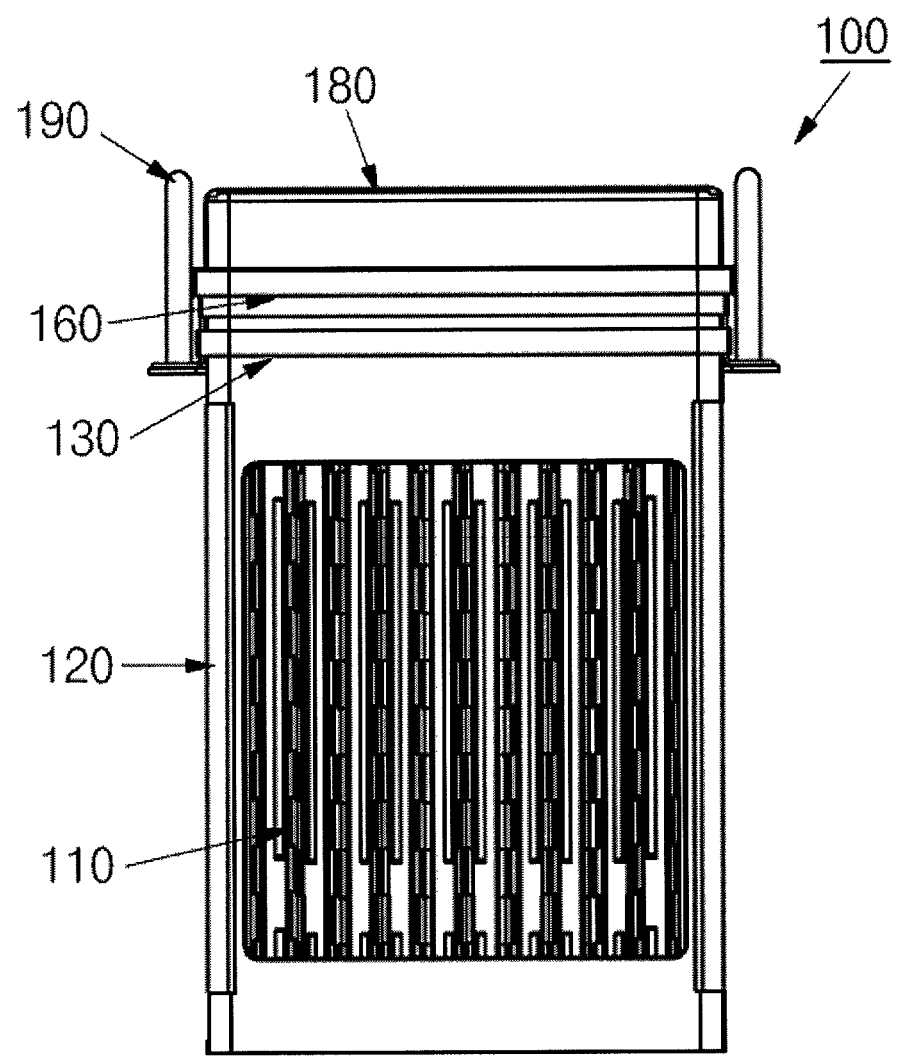
Figure 1C:
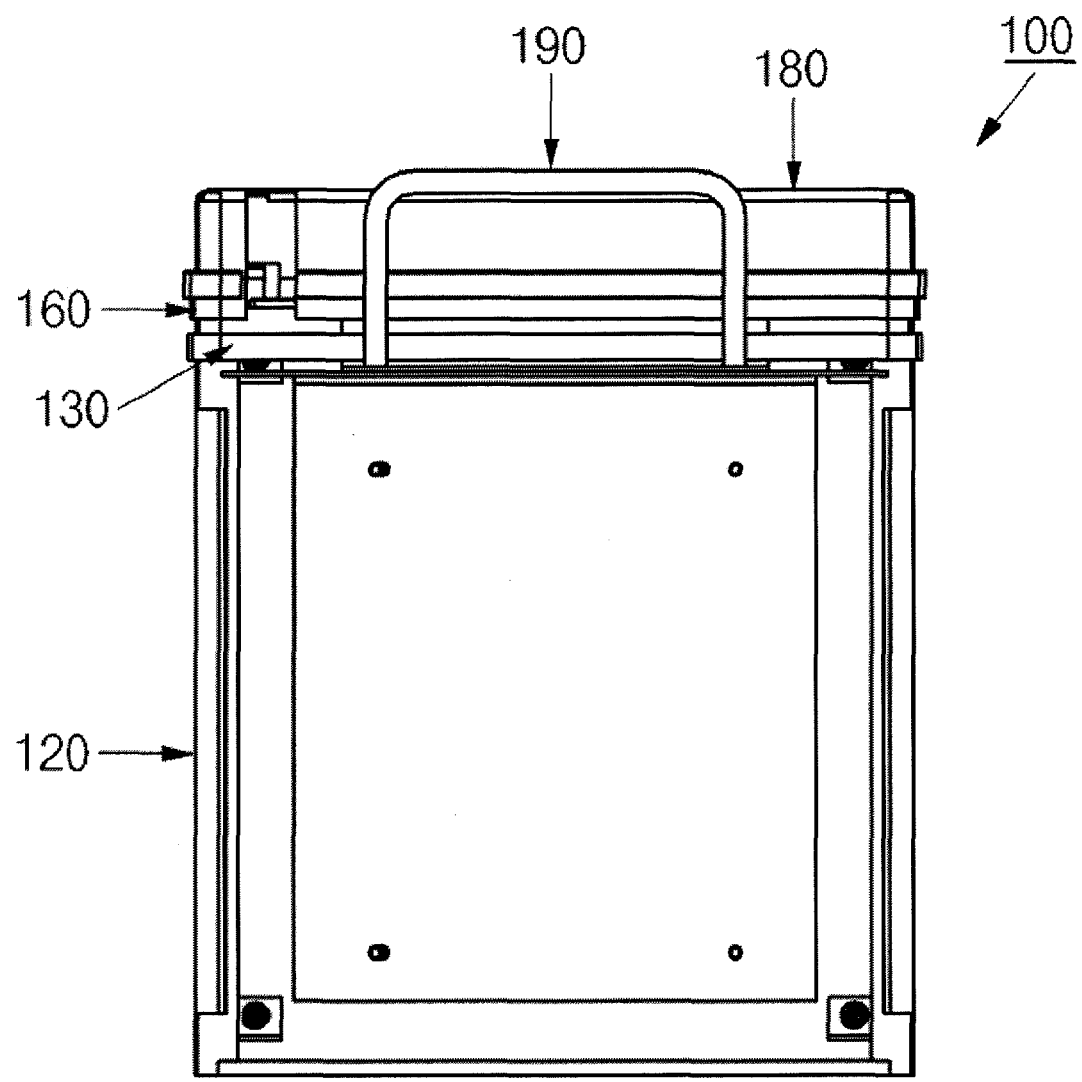
Figure 1D:
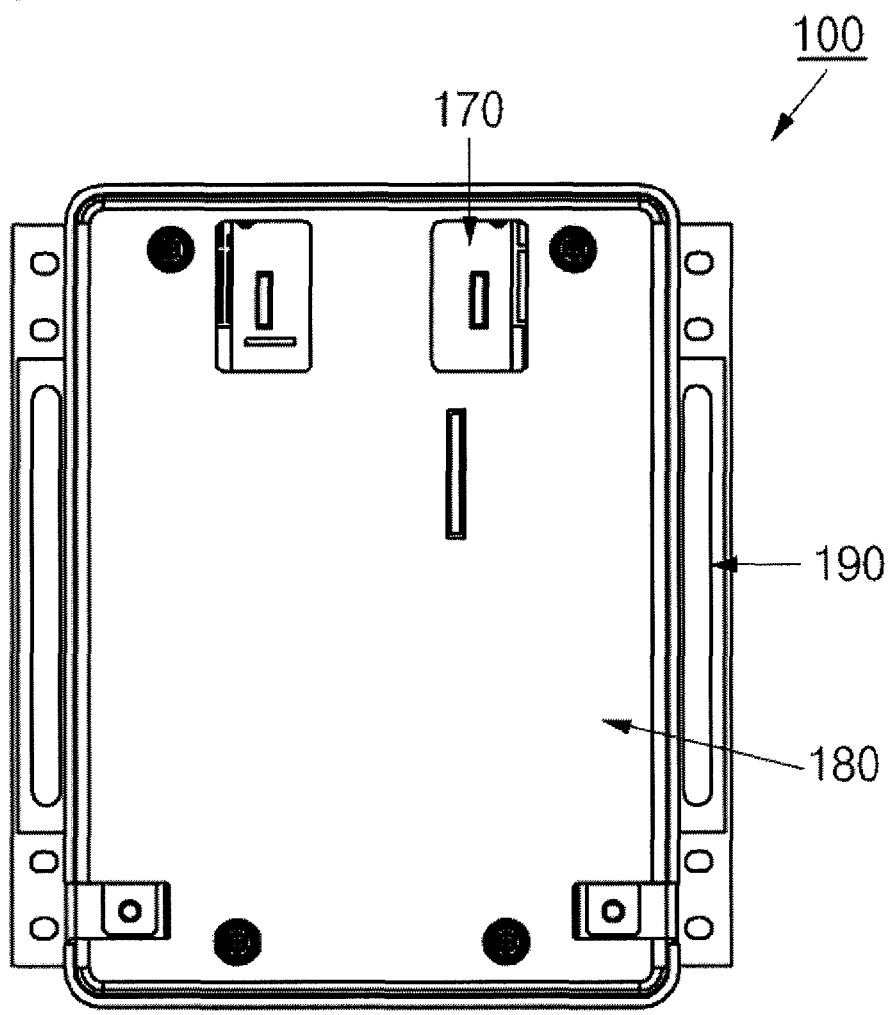
Figure 1E:
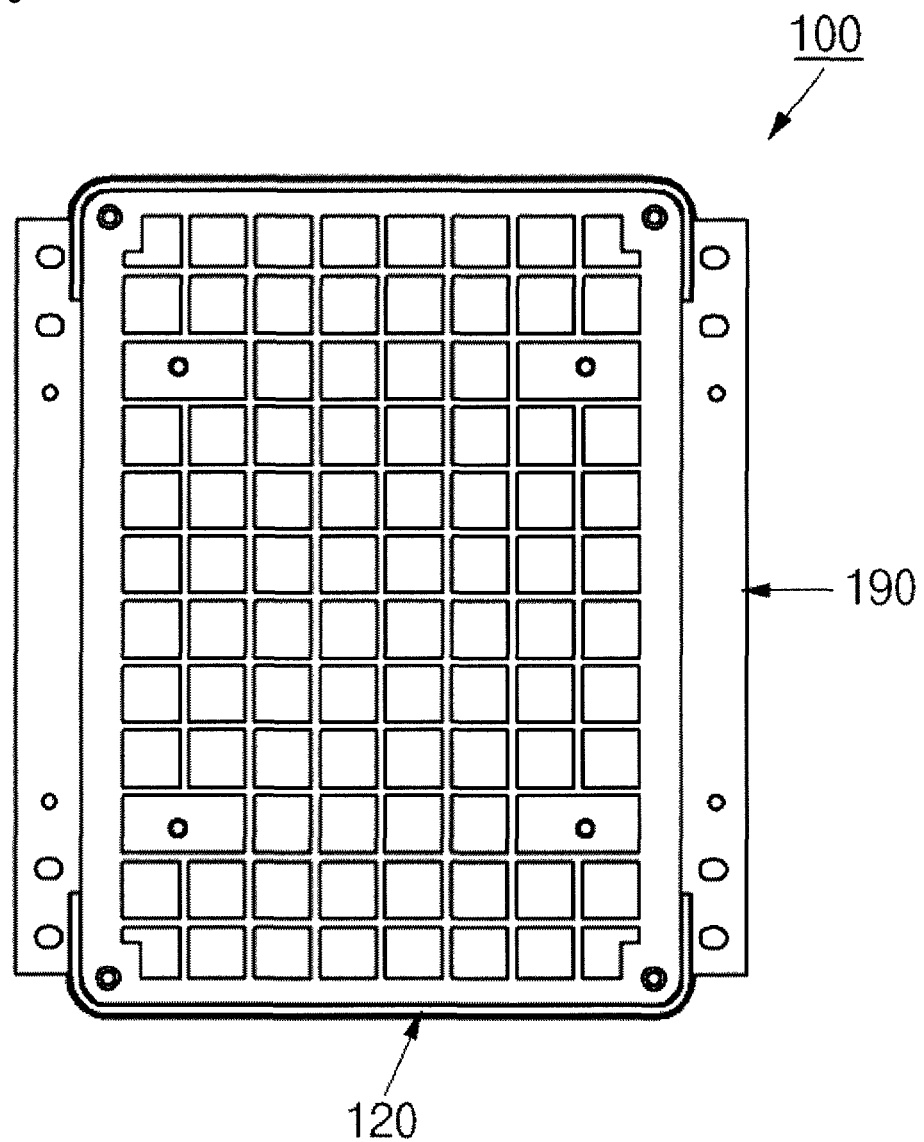

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

FIGS. 1A through 1E are a perspective view, a front view, a side view, a plan view, and a bottom view illustrating a battery pack 100 according to an embodiment.

The battery pack 100 of the embodiment includes: a battery stack 110; a housing 120 accommodating the battery stack 110; a middle cover 130 coupled to the housing 120; bus bars (not shown) electrically connected to the battery stack 110; temperature sensors (not shown) coupled to the battery stack 110; a sensing circuit board (not shown) electrically connected to the bus bars and the temperature sensors; an isolation plate 160 coupled to the middle cover 130 to cover the sensing circuit board; a battery management system 170 disposed on the isolation plate 160 and electrically connected to the sensing circuit board; a top cover 180 coupled to the isolation plate 160 to cover the battery management system 170, and handle parts 190 coupled to both sides of the housing 120.

Figure 2A:
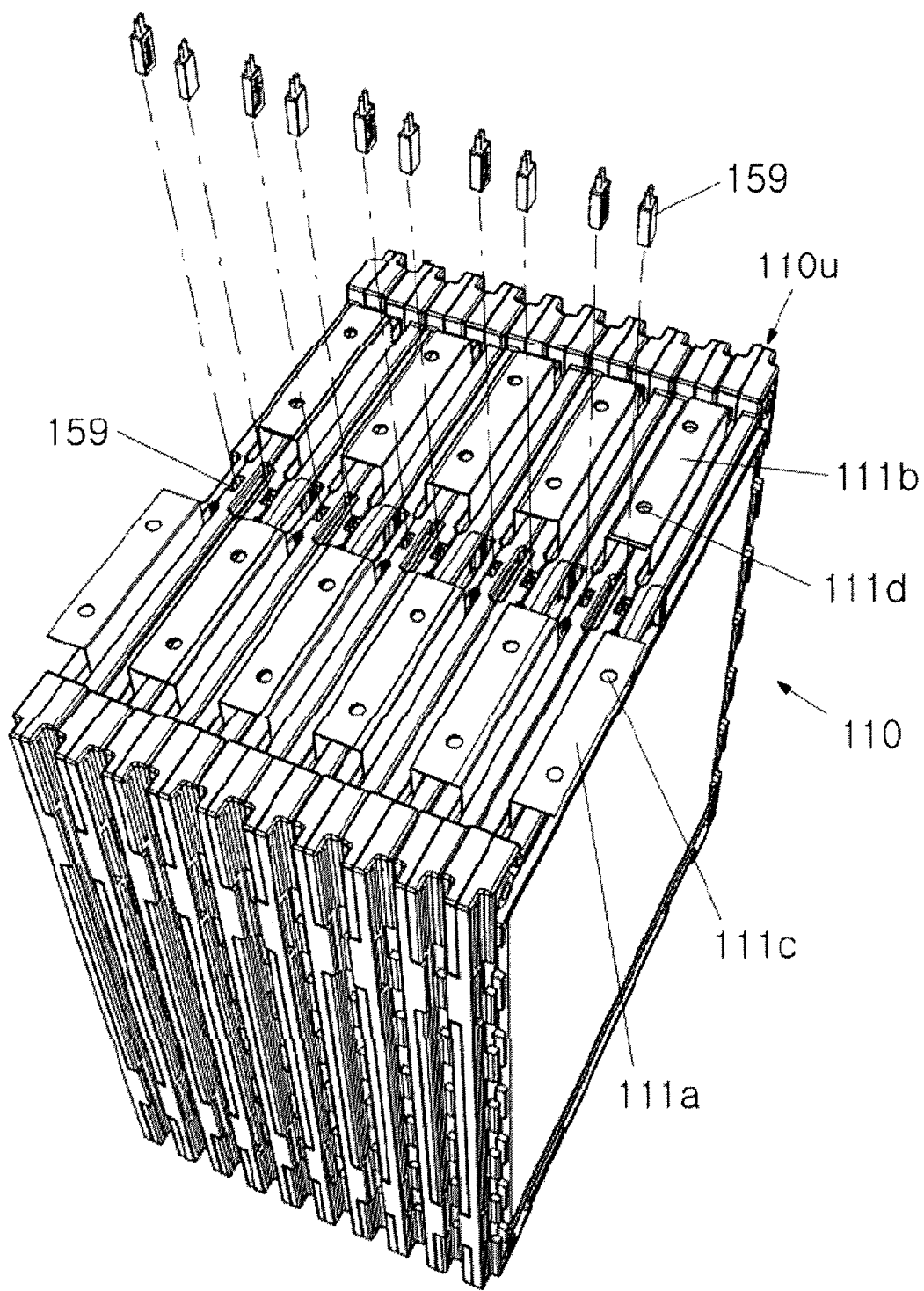
FIGS. 2A and 2B are perspective views wholly and partially illustrating a battery stack of the battery pack of the embodiment.
Figure 2B:
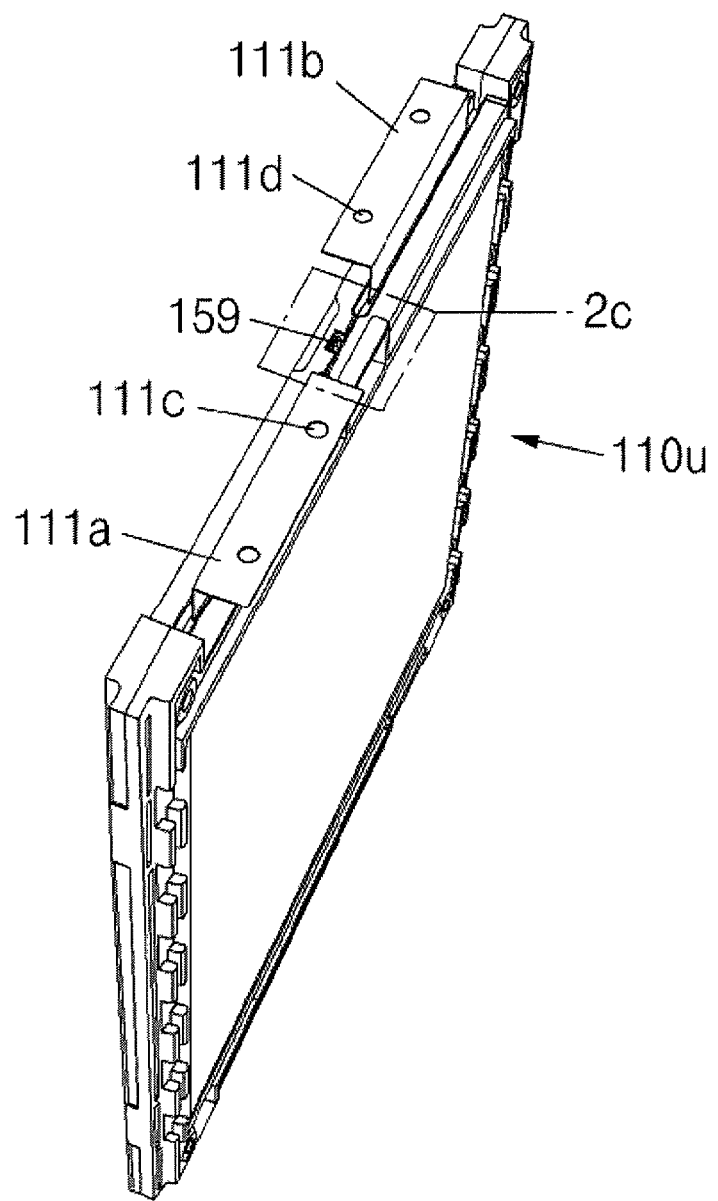
Figure 2D:
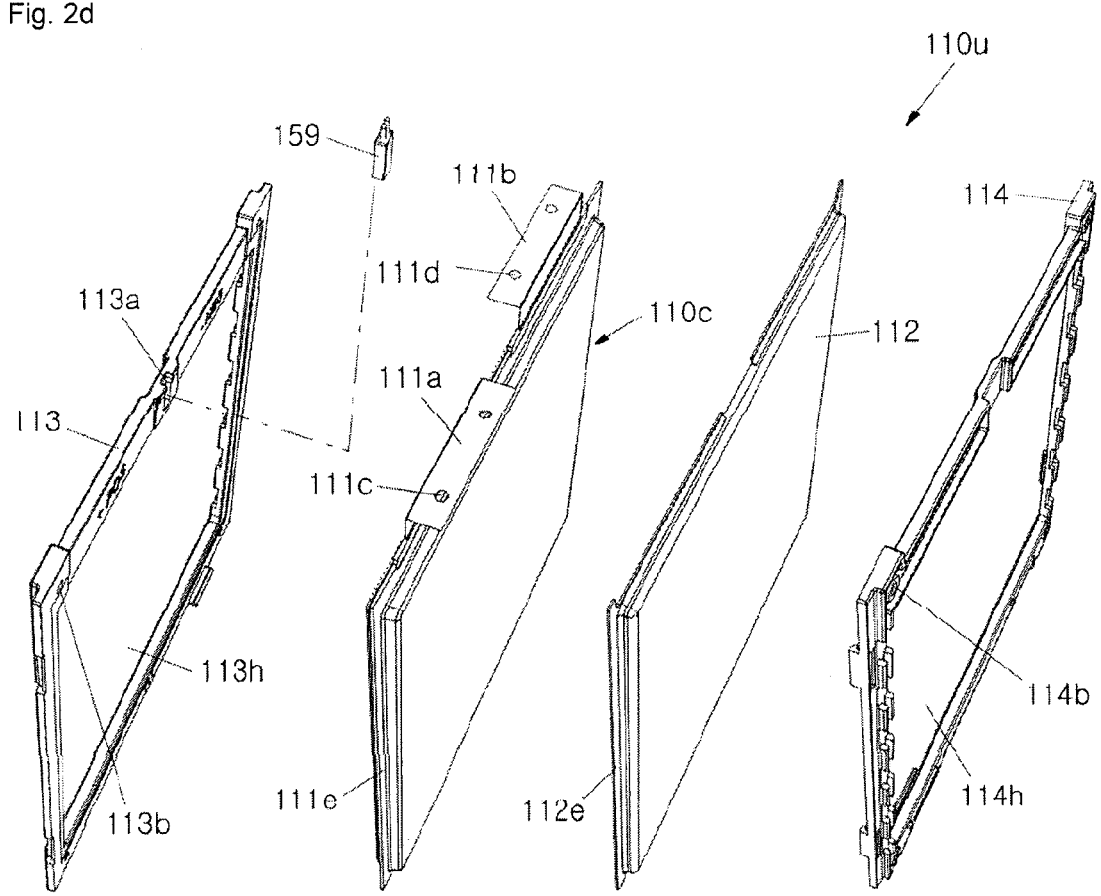
FIG. 2D is an exploded perspective view illustrating a battery unit.
Figure 2E:
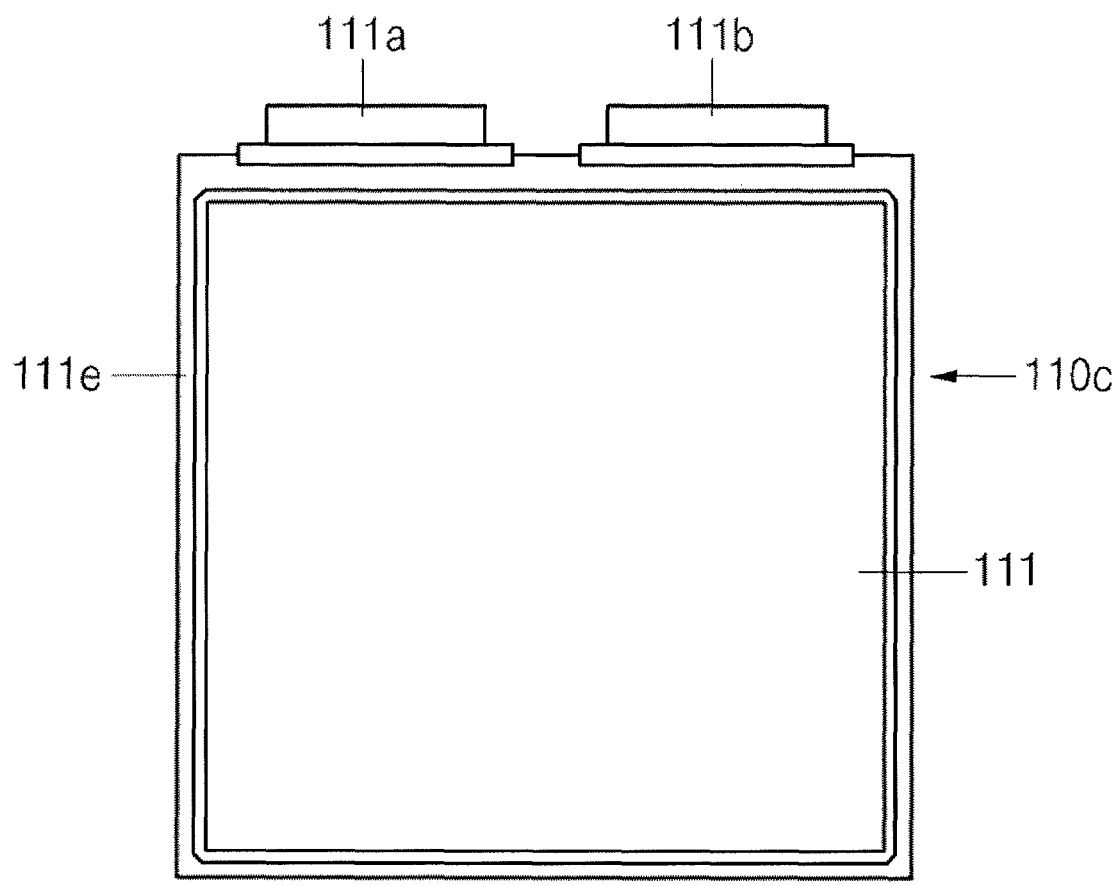
FIGS. 2E and 2F are a front view and a side view illustrating a battery cell.
Figure 2F:
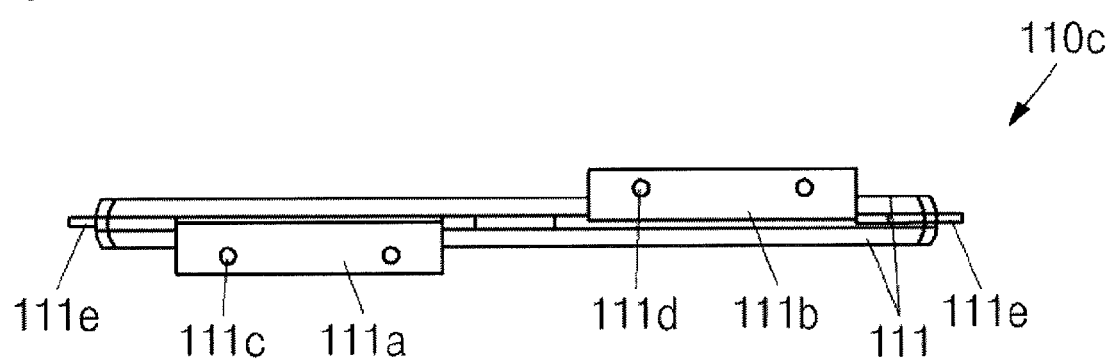

FIGS. 2A and 2B are perspective views wholly and partially illustrating the battery stack 110 of the battery pack 100 of the embodiment. FIG. 2C is an enlarged view illustrating portion 2c of FIG. 2B. FIG. 2D is an exploded perspective view illustrating a battery unit. FIGS. 2E and 2F are a front view and a side view illustrating a battery cell.

As shown in FIGS. 2A through 2C, the battery stack 110 includes a plurality of battery units 110u that are horizontally arranged. Temperature sensors 159 may be coupled to the battery units 110u.

The battery units 110u include battery cells (not shown). Each of the battery cells includes a first cell tab 111a and a second cell tab 111b. The first cell tab 111a has a positive or negative polarity, and the second cell tab 111b has a negative or positive polarity. Penetration holes 111c and 111d may be formed in the first and second cell tabs 111a and 111b. Fixing members (not shown) may be coupled to the penetration holes 111c and 111d for connecting bus bars (not shown) to the first and second cell tabs 111a and 111b. In the battery stack 110, a first cell tab 111a of a battery unit 110u may be placed on top of a second cell tab 111b of a neighboring battery unit 110u. In this way, the battery units 110u may be electrically connected in series. Alternatively, the battery units 110u may be electrically connected in parallel. Substantially, series or parallel connection of the battery units 110u is made by means of bus bars. This will be described later in detail.

As shown in FIG. 2D, each of the battery units 110u includes a battery cell 110c including the first and second cell tabs 111a and 111b, a heat sink 112 configured to cover a side of the battery cell 110c, a first frame 113 configured to cover the other side of the battery cell 110c, and a second frame 114 coupled to the first frame 113 to cover the heat sink 112.

The heat sink 112 covers a side of the battery cell 110c to rapidly dissipate heat generated from the battery cell 110c to an outside area. The heat sink 112 may be formed of one of aluminum, copper, and an equivalent thereof. However, materials that can be used to form the heat sink 112 are not limited thereto.

The first frame 113 and the second frame 114 covers edges 111e and 112e of the battery cell 110c and the heat sink 112. For example, the first frame 113 may cover edges 111e of the other side of the battery cell 110c, and the second frame 114 may cover edges 112e of the heat sink 112. For this, the first frame 113 and the second frame 114 are coupled to each other. The first frame 113 includes a first opening 113h so that the other side of the battery cell 110c except for the edges 111e can be exposed through the first opening 113h, and the second frame 114 includes a second opening 114h so that the heat sink 112 except for the edges 112e can be exposed through the second opening 114h.

The first and second frames 113 and 114 may be formed of a plastic resin. The first and second frames 113 and 114 include a sensor receiving part 113a so that the temperature sensor 159 can be placed in the sensor receiving part 113a and make contact with the battery cell 110c. In addition, the first and second frames 113 and 114 include penetration holes 113b and 114b so that fixing rods (not shown) can be inserted in the penetration holes 113b and 114b for fixing a plurality of battery units 110u to each other. The sensor receiving part 113a is formed in a region of the first frame 113 corresponding to the edges 111e of the battery cell 110c so that the temperature sensor 159 can make contact with the edges 111e of the battery cell 110c. The penetration holes 113b and 114b are formed at four corners of the first and second frames 113 and 114 so that four fixing rods can be coupled to the penetration holes 113b and 114b. The fixing rods will be described later.

As shown in FIGS. 2E and 2F, the battery cell 110c may be a pouch type battery cell. That is, the battery cell 110c may include a winding or stack type electrode assembly (not shown), a pouch 111 enclosing the electrode assembly, and the first and second cell tabs 111a and 111b electrically connected to the electrode assembly. The pouch 111 may include two sheets facing each other, and three or four sides of the pouch 111 may be welded around the electrode assembly to form three or four welded parts (that is, the edges 111e of the battery cell 110c). The three or four welded parts (edges 111e) are disposed between the first frame 113 and the second frame 114. The pouch 111 has a bag shape and is formed of a metal thin sheet both sides of which are coated with insulation layers.

Figure 3:
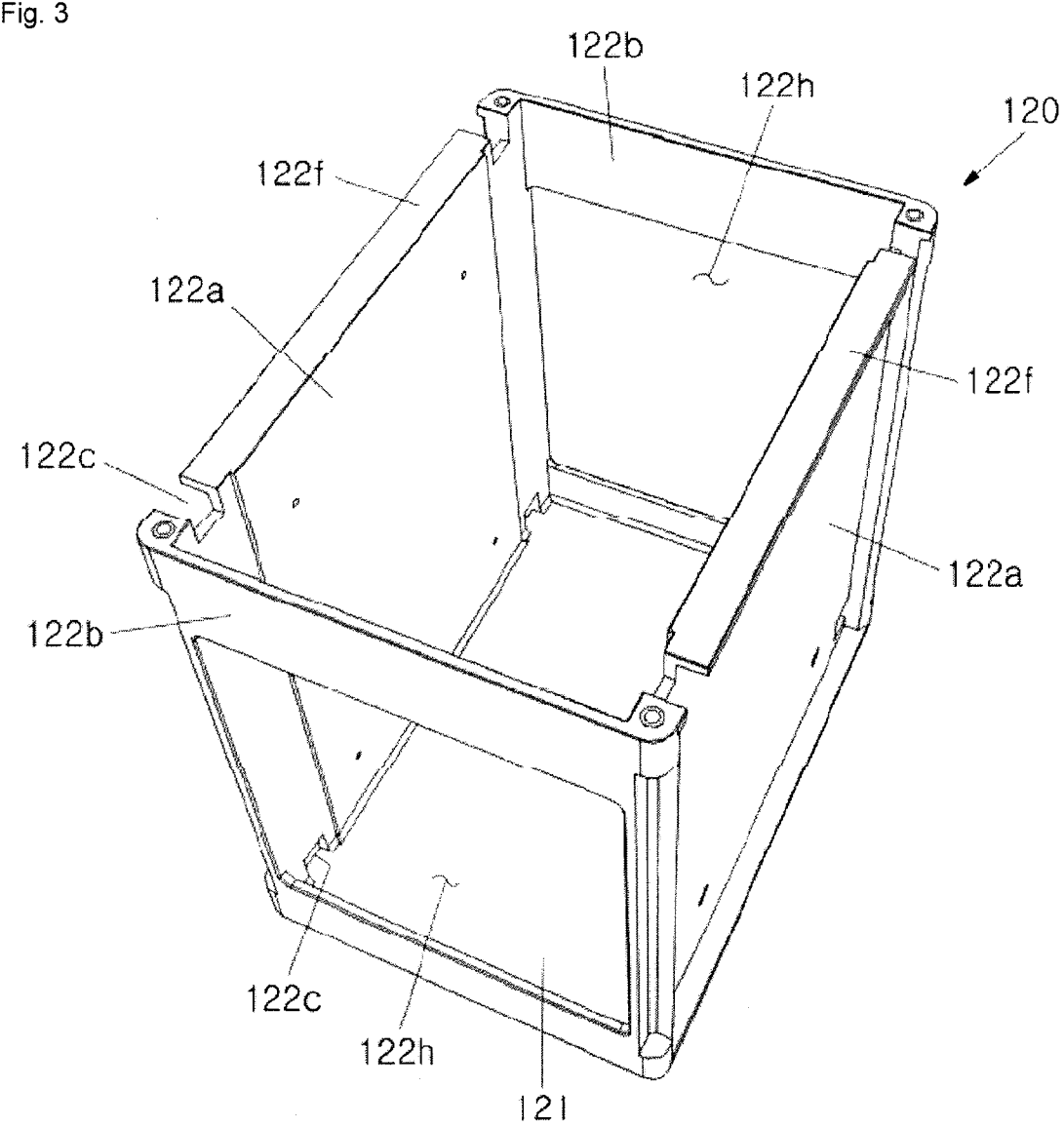
FIG. 3 is a perspective view illustrating one embodiment of a housing of the battery pack of the embodiment.

FIG. 3 is a perspective view illustrating the housing 120 of the battery pack 100 of the embodiment.

As shown in FIG. 3, the housing 120 includes a bottom side 121 and four lateral sides 122a and 122b extending upward from the bottom side 121. Openings 122h may be formed through mutually-facing two lateral sides 122b of the four lateral sides 122a and 122b. A cooling medium such as air may pass through the openings 122h to rapidly cool the battery stack 110. Flanges 122f are formed on the topsides of the other two lateral sides 122a, and portions of the handle parts 190 (refer to FIG. 1A) may be placed on the flanges 122f. The handle parts 190 will be described later. The handle parts 190 are disposed on the lateral sides 122a.

Rod accommodation parts 122c are formed at mutually-facing upper and lower parts of the housing 120 so that both ends of fixing rods (not shown) can be placed on the rod accommodation parts 122c. That is, fixing rods are inserted through the battery units 110u to couple the battery units 110u as the battery stack 110. At this time, both ends of the fixing rods are placed on the rod accommodation parts 122c of the housing 120. Generally, four fixing rods may be used, and thus four rod accommodation parts 122c may be formed.

The housing 120 may be formed of one of a plastic resin, an engineering plastic, and a metal. However, materials that can be used to form the housing 120 are not limited thereto.

Figure 4:
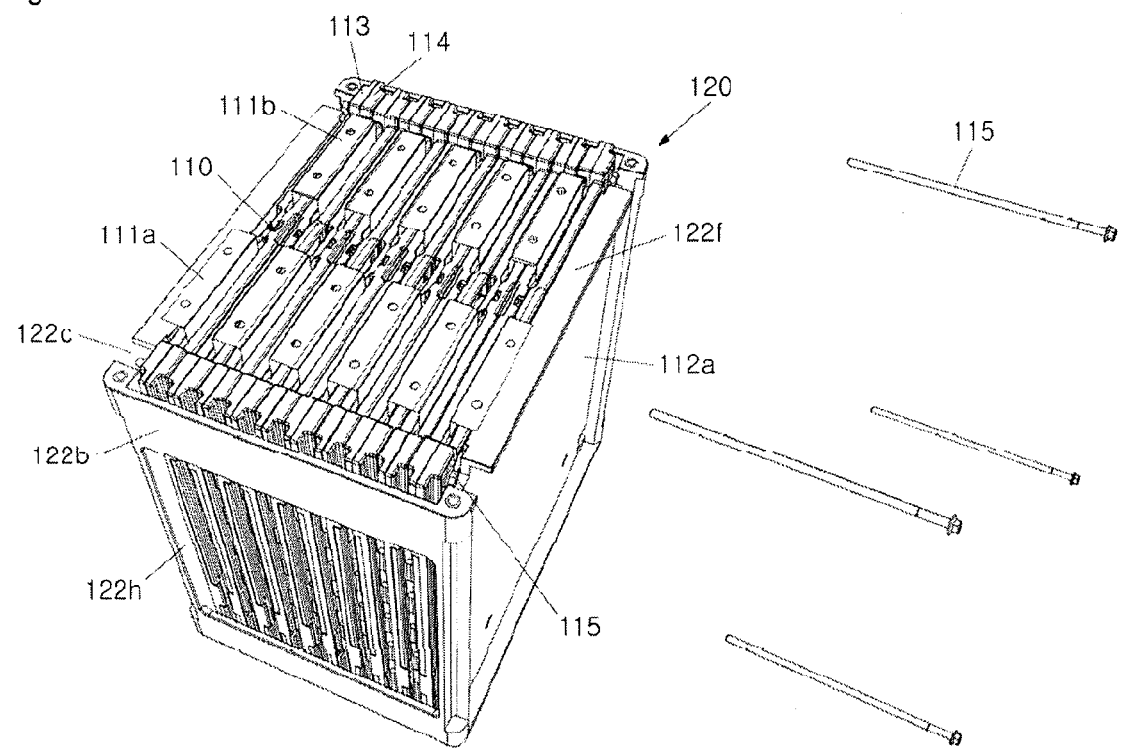
FIG. 4 is a perspective view illustrating the battery stack coupled to the housing according to the embodiment.

FIG. 4 is a perspective view illustrating the battery stack 110 coupled to the housing 120 according to the embodiment.

As shown in FIG. 4, the battery stack 110 is coupled to the housing 120. As described above, the battery units 110u of the battery stack 110 are horizontally arranged to face each other, and interfaces of the battery units 110u are aligned with the openings 122h of the housing 120. Therefore, a cooling medium can flow through the interfaces of the battery units 110u. Fixing rods 115 are inserted through four regions of the battery stack 110, and both ends of the fixing rods 115 are placed on the rod accommodation parts 122c of the housing 120. Ends of the fixing rods 115 are shaped like a bolt head, and the other ends of the fixing rods 115 are threaded so that nuts (not shown) can be coupled to the other ends of the fixing rods 115.

Figure 5:
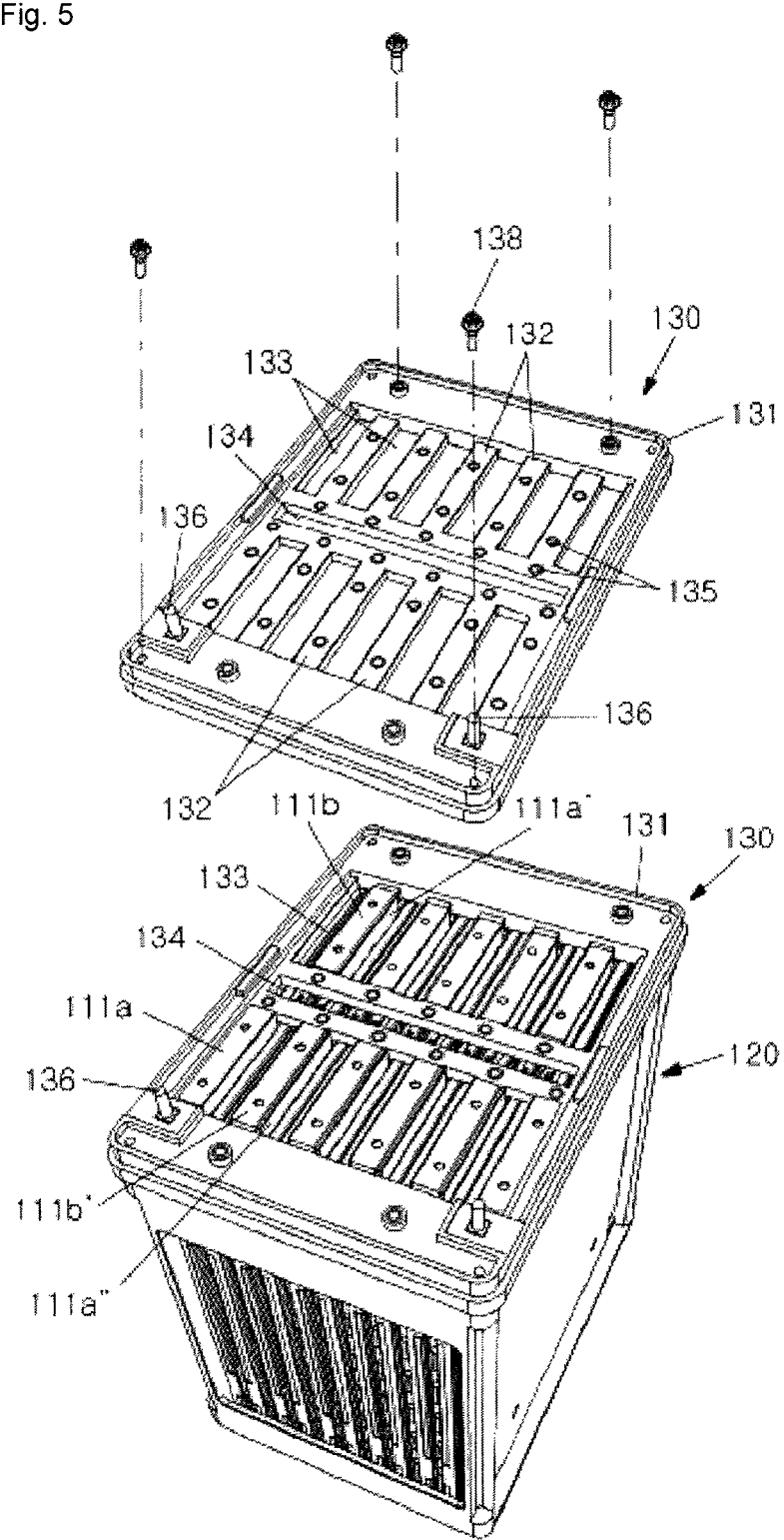
FIG. 5 is a perspective view for illustrating how a middle cover is coupled to the housing of the battery pack according to the embodiment.

FIG. 5 is a perspective view for illustrating how the middle cover 130 is coupled to the housing 120 of the battery pack 100 according to the embodiment.

As shown in FIG. 5, the middle cover 130 is shown both detached and coupled to the housing 120 using fixing members 138 such as bolts. The middle cover 130 includes a frame part 131 and a plurality of supports 132. The frame part 131 is placed on upper edges of the housing 120, and the supports 132 are disposed inside the frame part 131 so that the first and second cell tabs 111a and 111b can be placed on the supports 132. Penetration holes 133 may be formed between the supports 132 of the middle cover 130, and another penetration hole 134 may be formed in an approximately center portion of the middle cover 130.

The supports 132 are staggered along both sides of the penetration hole 134. The supports 132 are staggered because the first and second cell tabs 111a and 111b are bent in opposite directions. The first and second cell tabs 111a and 111b are bent in opposite directions, for example, because electric series connection of the battery cells 110c can be easily made. For example, as shown in FIG. 5, the first cell tab 111a of a battery cell 110c is electrically connected to a terminal 136, and the second cell tab 111b of the battery cell 110c is electrically connected to the first cell tab 111a' of a neighboring battery cell 110c. In addition, the second cell tab 111W of the neighboring battery cell 110c is electrically connected to the first cell tab 111a" of another neighboring battery cell 110c. That is, since the supports 132 are staggered along both sides of the penetration hole 134 in the middle cover 130, electric series connection of the battery cells 110c can be easily made.

The first and second cell tabs 111a and 111b are placed on the supports 132 in a state where the first and second cell tabs 111a and 111b are bent in opposite directions. Metal bushes 135 are coupled to the supports 132 so that the first and second cell tabs 111a and 111b can be stably fixed by using fixing members (not shown). After the first and second cell tabs 111a and 111b are placed on the supports 132, bus bars (not shown) are coupled to the supports 132.

Terminals 136 may be formed at both sides of the middle cover 130, and bus bars (not shown) may be coupled to the terminals 136. One of the terminals 136 may be a positive terminal, and the other of the terminals 136 may be a negative terminal.

Figure 6A:
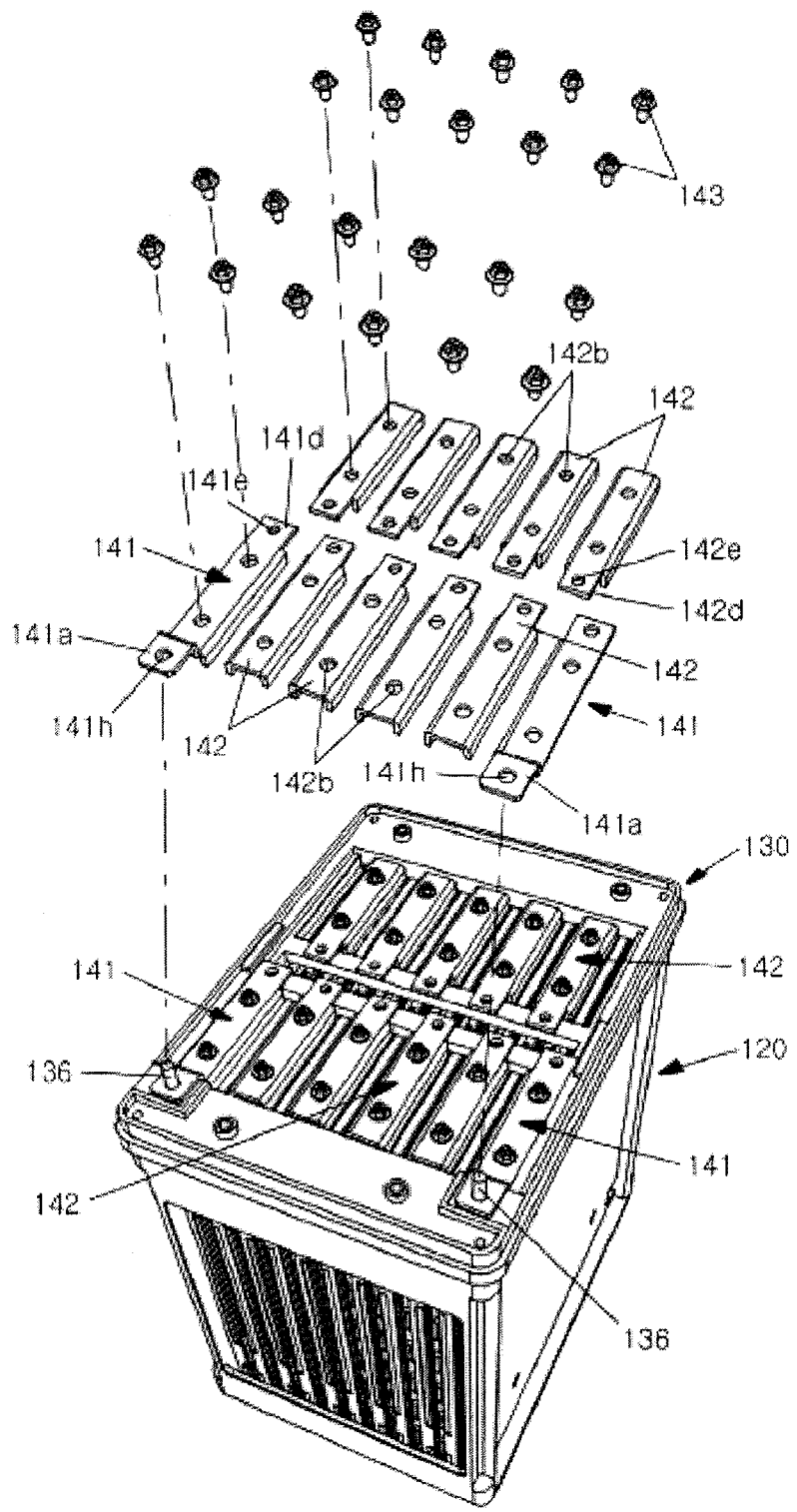
FIGS. 6A and 6B are a perspective view and a sectional view for illustrating how bus bars are coupled to the middle cover of the battery pack according to the embodiment.
Figure 6B:
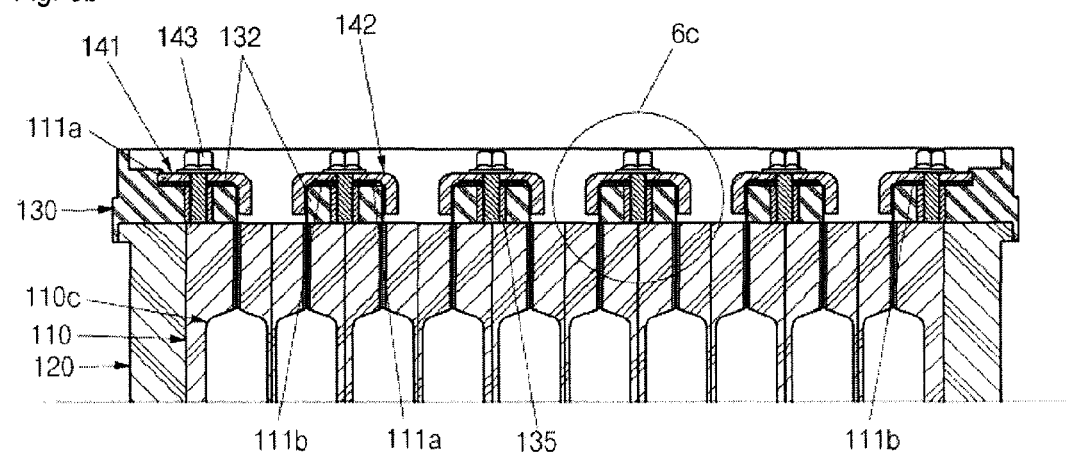
Figure 6C:
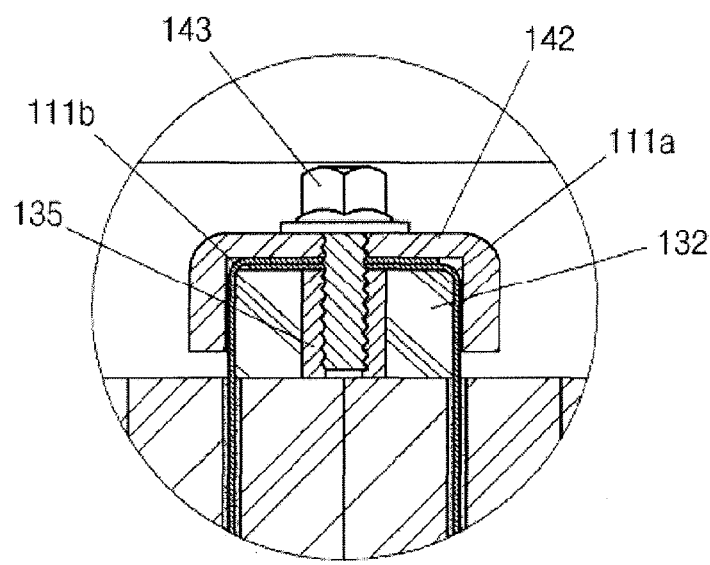
FIG. 6C is an enlarge view illustrating portion 6c of FIG. 6C.

FIGS. 6A and 6B are a perspective view and a sectional view for illustrating how bus bars are coupled to the middle cover 130 of the battery pack 100 according to the embodiment, and FIG. 6C is an enlarge view illustrating portion 6c of FIG. 6C.

As shown in FIGS. 6A through 6C, two kinds of bus bars 141 and 142 are coupled to the supports 132 of the middle cover 130 by using fixing members 143 such as bolts. For example, a first cell tab 111a may be disposed on a support 132 of the middle cover middle cover 130; a second cell tab 111b may be disposed on another support 132, and the other first and second cell tabs 111a and 111b may be disposed on the other supports 132 in an overlapped manner. In this state, the bus bars 141 and 142 are placed on the supports 132.

The bus bars 141 have an approximately "⌐" or "⌐" shape. One of the bus bars 141 is placed on the support 132 on which only the first cell tab 111a is disposed, and the other of the bus bars 141 is placed on the support 132 on which only the second cell tab 111b is disposed. Therefore, the first and second cell tabs 111a and 111b can make contact with at least two surfaces of the supports 132 and at least two surfaces of the bus bars 141. In addition, the fixing members 143 are coupled to the supports 132 through the bus bars 141 and the first and second cell tabs 111a and 111b. In detail, the fixing members 143 are fixed to the metal bushes 135 of the supports 132. Extensions 141a extend from ends of the bus bars 141, and penetration holes 141h are formed in the extensions 141a. The terminals 136 of the middle cover 130 are mechanically and electrically coupled to the penetration holes 141h of the extensions 141a. That is, the terminals 136 are coupled to the penetration holes 141h.

The bus bars 142 have an approximately "∩" shape. The bus bars 142 are placed on the supports 132 where the first and second cell tabs 111a and 111b are superimposed. Therefore, the first and second cell tabs 111a and 111b can make contact with at least two or three surfaces of the supports 132 and at least two or three surfaces of the bus bars 141. In addition, penetration holes 142b are formed in the bus bars 142 so that the fixing members 143 can be coupled to the supports 132 through the penetration holes 142b of the bus bars 142. In detail, the fixing members 143 are coupled to the supports 132 through the bus bars 142 and the first and second cell tabs 111a and 111b. The fixing members 143 are fixed to the metal bushes 135 of the supports 132.

Extensions 141d and 142d having penetration holes 141e and 142e are formed on the bus bars 141 and 142 so that a sensing circuit board (not shown) can be fixed to the extensions 141d and 142d by using fixing members.

The extensions 141a and 141d are formed on both ends of the bus bars 141 that are electrically connected to the terminals 136, the first and second cell tabs 111a and 111b, and the sensing circuit board. The extends 142d are formed on ends of the bus bars 142 that are electrically connected to the first and second cell tabs 111a and 111b and the sensing circuit board.

In this way, the terminals 136 are mechanically and electrically connected to the battery cells 110c through the bus bars 141, and the battery cells 110c are mechanically and electrically connected in series (or parallel) to each other through the bus bars 142. Particularly, since the fixing members 143 are mechanically secured to the supports 132 through the bus bars 141 and 142 and the first and second cell tabs 111a and 111b, the bus bars 141 and 142 of the embodiment can provide mechanically and electrically reliable connection structures.

Figure 7A:
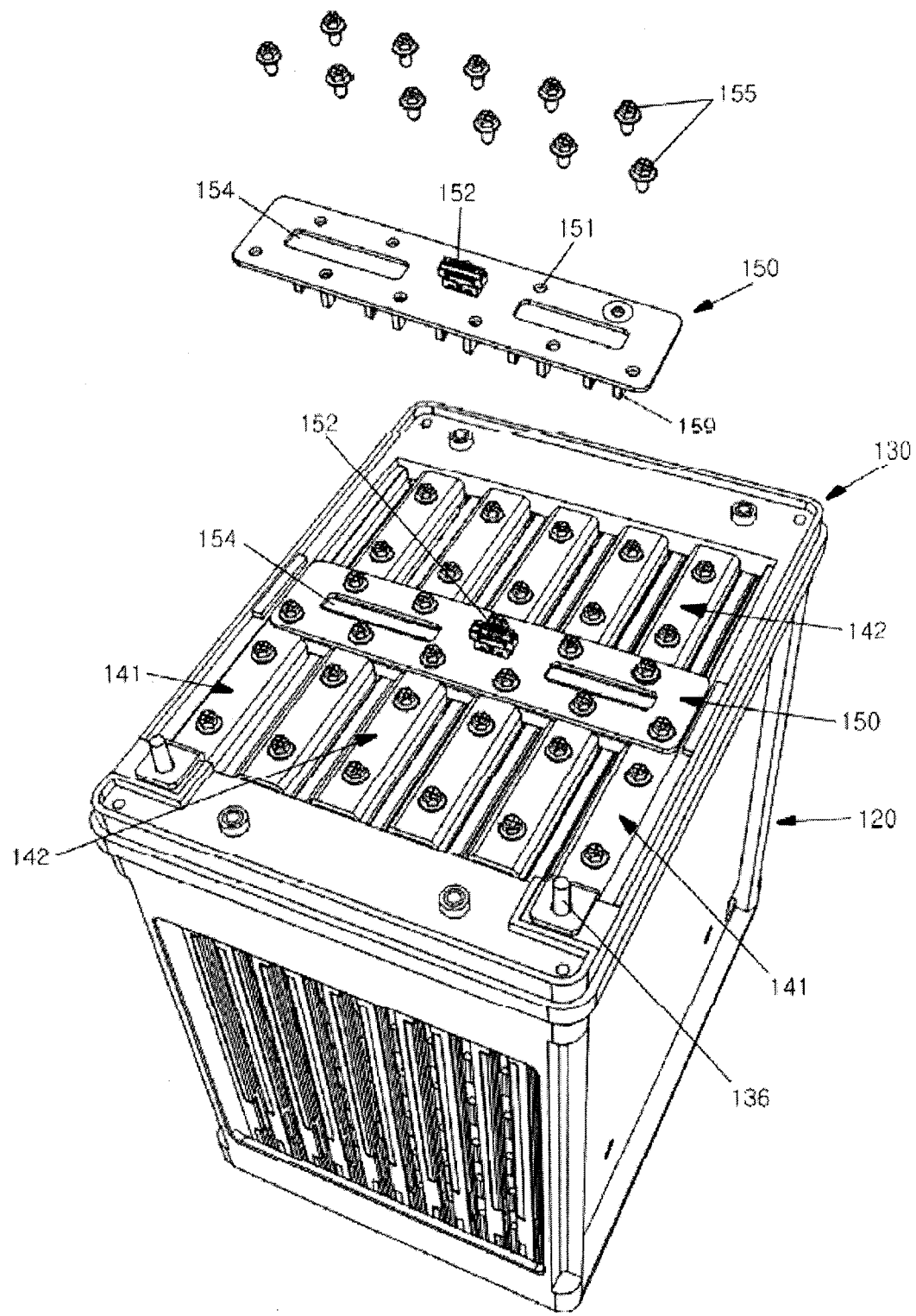
FIGS. 7A and 7B are a perspective view and a sectional view for illustrating how a sensing circuit board is coupled to the bus bars of the battery pack according to the embodiment.
Figure 7B:
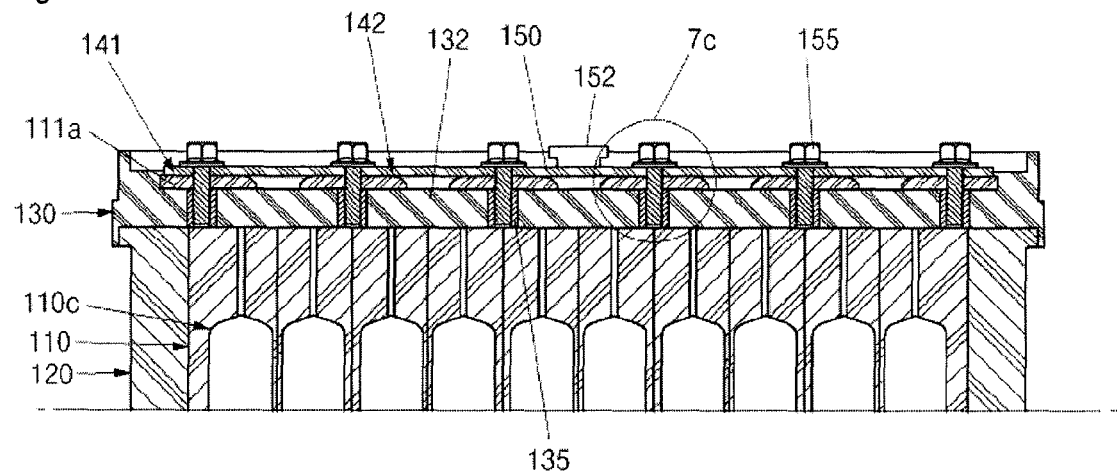
Figure 7C:
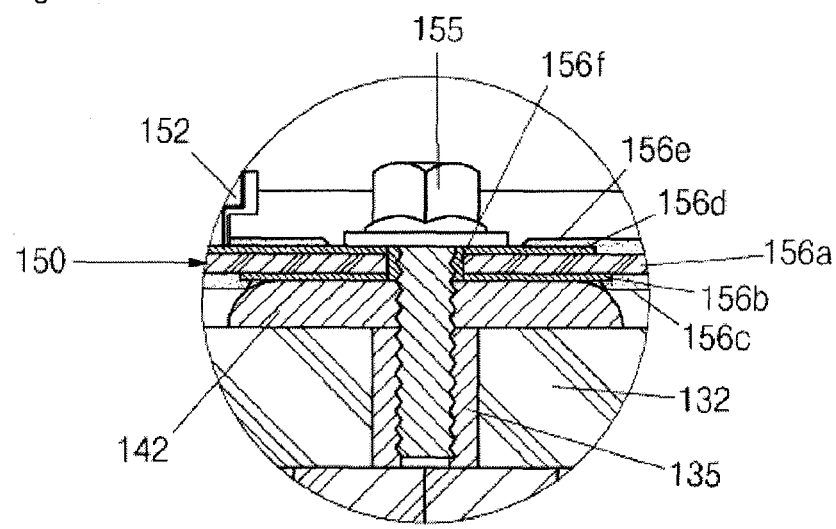
FIG. 7C is an enlarged view illustrating portion 7c of FIG. 7C.

FIGS. 7A and 7B are a perspective view and a sectional view for illustrating how a sensing circuit board 150 is coupled to the bus bars 141 and 142 of the battery pack 100 according to the embodiment, and FIG. 7C is an enlarge view illustrating portion 7c of FIG. 7C.

As shown in FIGS. 7A and 7B, the sensing circuit board 150 is coupled to the bus bars 141 and 142 by using fixing members 155 such as bolts. That is, the sensing circuit board 150 is placed on the bus bars 141 and 142 at the extensions 141d and 142d having the penetration holes 141e and 142e. Then, the sensing circuit board 150 is fixed to the extensions 141d and 142d of the bus bars 141 and 142 by using the fixing members 155. The sensing circuit board 150 includes penetration holes 151 at positions corresponding to the extensions 141d and 142d of the bus bars 141 and 142, and some of the metal bushes 135 of the supports 132 are located at the positions corresponding to the extensions 141d and 142d of the bus bars 141 and 142. That is, the fixing members 155 are coupled to the metal bushes 135 of the supports 132 through the sensing circuit board 150 and the bus bars 141 and 142. In this way, the bus bars 141 and 142 and the sensing circuit board 150 are mechanically and electrically connected to each other. Conductive patterns (not shown) are formed in regions of the sensing circuit board 150 that are electrically connected to the bus bars 141 and 142. The temperature sensors 159 may be electrically connected to the sensing circuit board 150 or may be disposed in the sensing circuit board 150. The sensing circuit board 150 may include a connector 152. The connector 152 may be electrically connected to the battery management system 170 (refer to FIGS. 1A and 1D) through a flexible circuit board (not shown). Penetration holes 154 may be formed through center portions of the sensing circuit board 150. The penetration holes 154 are aligned with the penetration hole 134 of the middle cover 130. Therefore, a cooling medium such as air can be supplied to the battery stack 110 through the penetration holes 154 of the sensing circuit board 150 and the penetration hole 134 of the middle cover 130.

In this way, the bus bars 141 and 142 are directly connected to the sensing circuit board 150. Therefore, voltage information of the whole battery cells 110c and the respective battery cells 110c can be transmitted to the sensing circuit board 150. The temperature sensors 159 are directly connected to the sensing circuit board 150 so that temperature information of the respective battery cells 110c can be transmitted to the sensing circuit board 150.

As shown in FIG. 7C, the sensing circuit board 150 includes: an insulation core layer 156a; a first conductive pattern 156b formed on the bottom surface of the insulation core layer 156a; a first protective layer 156c covering the circumference of the first conductive pattern 156b; a second conductive pattern 156d formed on the top surface of the insulation core layer 156a; a second protective layer 156e covering the circumference of the second conductive pattern 156d; and conductive vias 156f electrically connecting the first conductive pattern 156b and the second conductive pattern 156d. The second conductive pattern 156d is electrically connected to the connector 152. The conductive vias 156f may be formed on the inner walls of the penetration holes 151. Alternatively, the conductive vias 156f may be formed on the circumferences of the penetration holes 151. The first and second protective layers 156c and 156e are formed of an insulation material.

The fixing members 155 are coupled to the metal bushes 135 of the supports 132 through the conductive vias 156f formed on the inner walls of the penetration holes 151 of the sensing circuit board 150. Then, the first conductive pattern 156b of the sensing circuit board 150 can be brought into tight contact with the bus bars 141 and 142. As a result, the first conductive pattern 156b can be electrically and mechanically connected to the bus bars 141 and 142. That is, electric signals can be transmitted between the connector 152 and the bus bars 141 and 142 through the first conductive pattern 156b, the conductive vias 156f, and the second conductive pattern 156d.

In the related art, additional connection lines are necessary for connection with bus bars. However, according to the embodiment, additional connection lines are not necessary because the sensing circuit board 150 on which a plurality of conductive patterns are formed is electrically and mechanically connected to the bus bars 141 and 142 through a simple operation. Therefore, electric signal paths can be shortened, and the assembling process of the battery pack 100 can be simple.

Figure 8A:
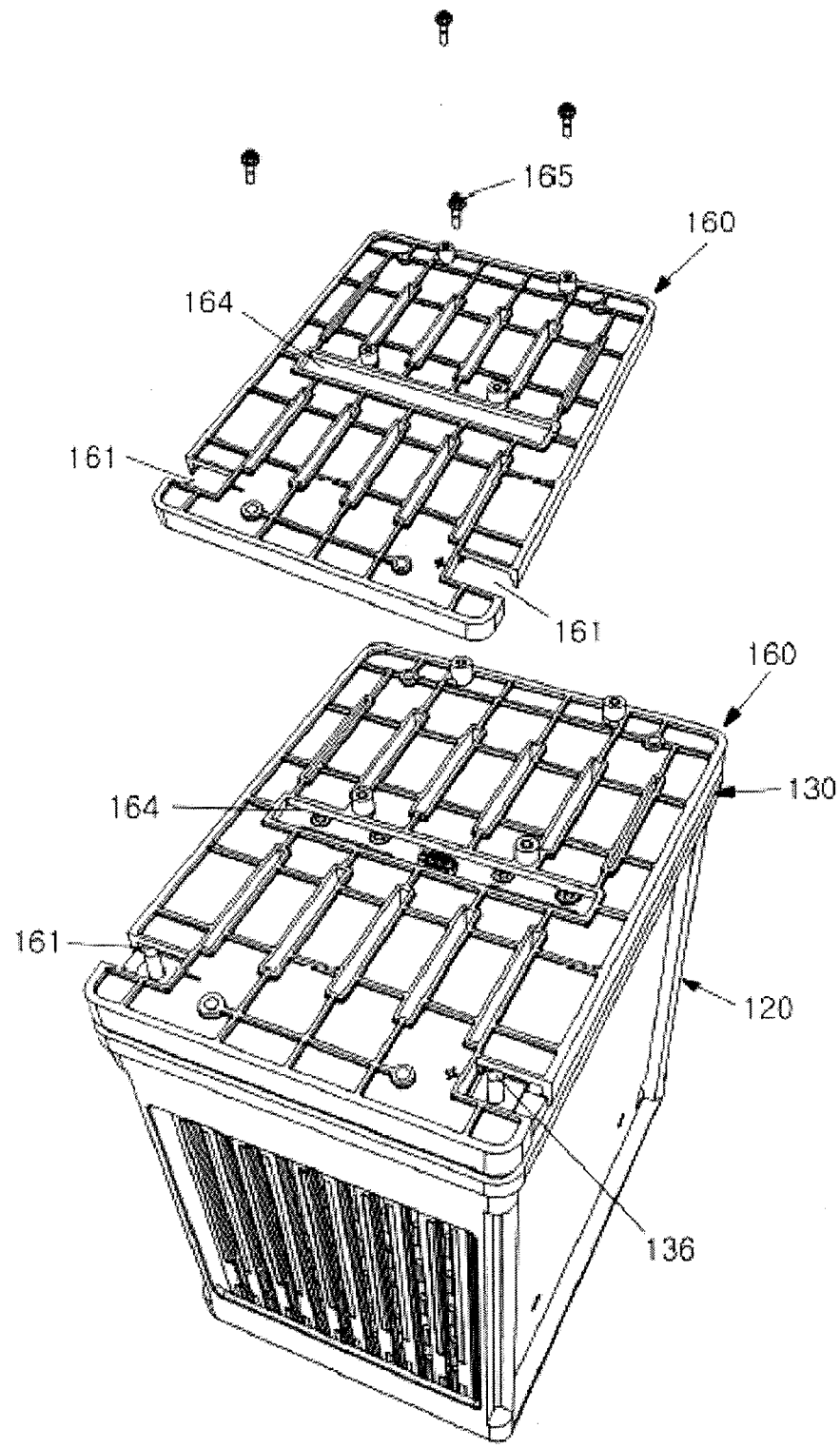
FIG. 8A is a perspective view for illustrating how an isolation plate is coupled to the middle cover of the battery pack according to the embodiment.
Figure 8B:
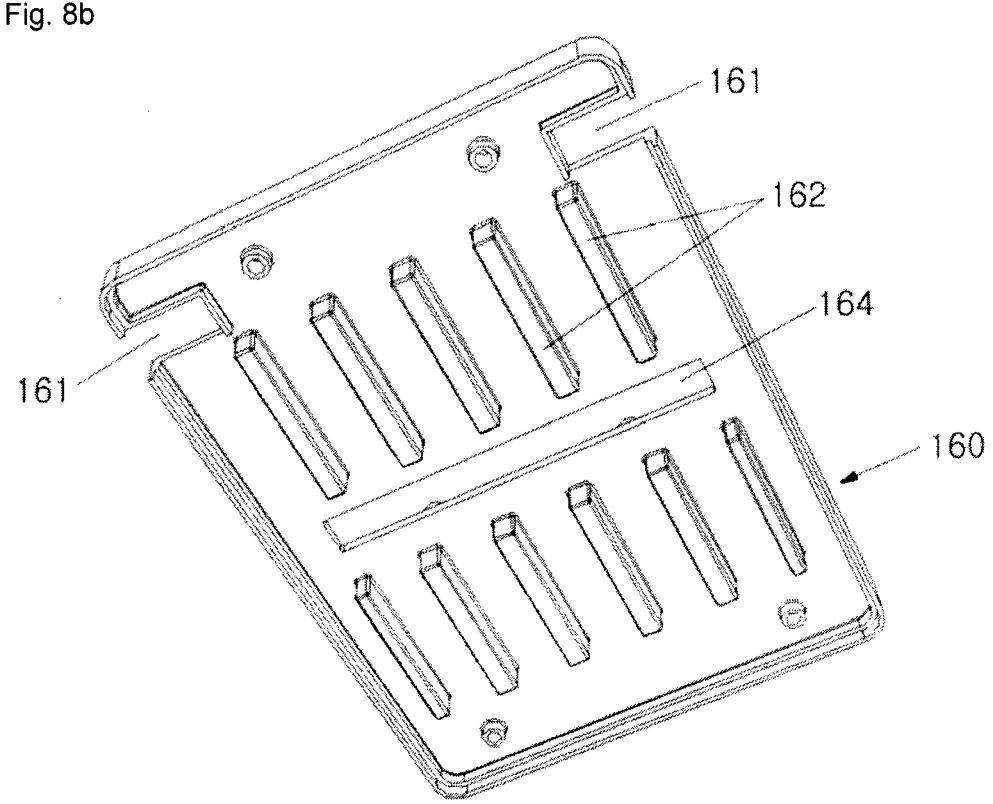
FIG. 8B is a bottom perspective view illustrating the isolation plate.
Figure 8C:
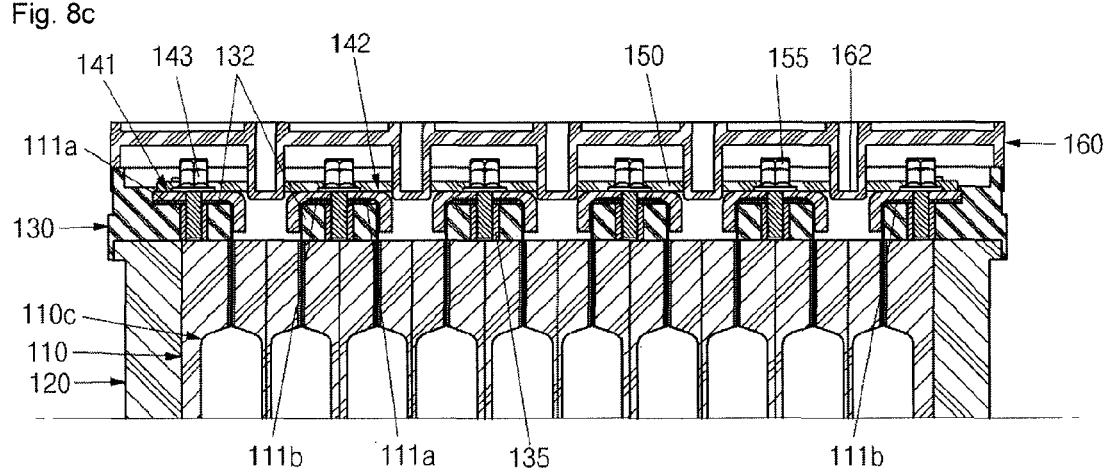
FIG. 8C is a partial sectional view illustrating a coupled state of the isolation plate.

FIG. 8A is a perspective view for illustrating how the isolation plate 160 is coupled to the middle cover 130 of the battery pack 100 according to the embodiment, FIG. 8B is a bottom perspective view illustrating the isolation plate 160, and FIG. 8C is a partial sectional view illustrating a coupled state of the isolation plate 160.

As shown in FIG. 8A, the isolation plate 160 may be fixed to the middle cover 130 by using fixing members 165 such as bolts. The isolation plate 160 may include cut portions 161 at both lateral sides so that the terminals 136 of the middle cover 130 can be exposed. A penetration hole 164 may be formed through an approximately center portion of the isolation plate 160. The penetration hole 164 is aligned with the penetration holes 154 of the sensing circuit board 150 and the penetration hole 134 of the middle cover 130. Therefore, a cooling medium such as air can be supplied to the battery stack 110 through the penetration hole 164 of the isolation plate 160, the penetration holes 154 of the sensing circuit board 150, and the penetration hole 134 of the middle cover 130.

In this way, since the isolation plate 160 covers approximately all the bus bars 141 and 142, the bus bars 141 and 142 can be safely isolated and insulated from the outside of the battery pack 100. Therefore, the bus bars 141 and 142 can be protected from contaminants, and thus a short circuit or contamination of the bus bars 141 and 142 can be prevented.

As shown in FIG. 8B, a plurality of protrusions 162 may extend downward from the isolation plate 160. The protrusions 162 may disposed between the bus bars 141 and 142.

As shown in FIG. 8C, the first and second cell tabs 111a and 111b of the battery stack 110 are bent and in contact with the supports 132 of the middle cover 130. For example, as shown in FIG. 8C, the leftmost first cell tab 111a is bent along the support 132 in an approximately "⊓" shape and is brought into contact with the support 132, and the rightmost second cell tab 111b is bent in an approximately "⌐" shape along the support 132 and is brought into contact with the support 132. The rest of the first and second cell tabs 111a and 111b are overlapped with each other and are bent along the supports 132 in an "∩" shape along the supports 132 in contact with the supports 132. For example, after the first and second cell tabs 111a and 111b are bent, the first and second cell tabs 111a and 111b may be overlapped with each other and be brought into contact with the supports 132.

In addition, the bus bars 141 and 142 having ⊓, ⌐, and ∩ shapes are coupled to the supports 132, and then the fixing members 143 are coupled to the bus bars 141 and 142. That is, the fixing members 143 are coupled to the bushes 135 of the supports 132 through the bus bars 141 and 142 and the first and second cell tabs 111a and 111b.

In addition, the sensing circuit board 150 is disposed on the bus bars 141 and 142 and is electrically connected to the bus bars 141 and 142 using the fixing members 155.

Furthermore, the isolation plate 160 is coupled to the middle cover 130 in a state where the protrusions 162 of the isolation plate 160 is disposed between the bus bars 141 and 142. Therefore, an electric short circuit can be prevented between the bus bars 141 and 142.

Figure 9:
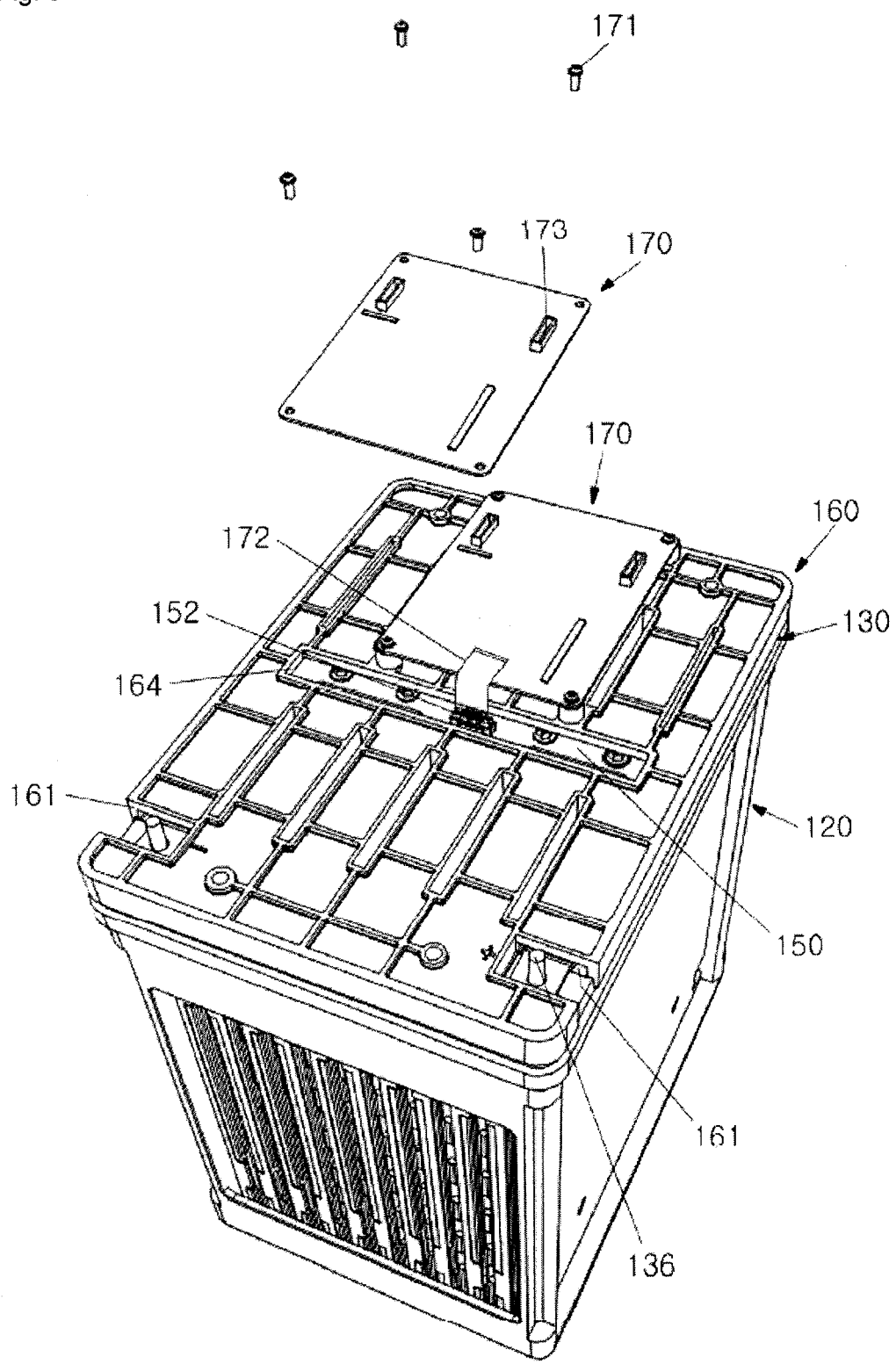
FIG. 9 is a perspective view for illustrating how a battery management system is coupled to the isolation plate of the battery pack according to the embodiment.

FIG. 9 is a perspective view for illustrating how the battery management system 170 is coupled to the isolation plate 160 of the battery pack 100 according to the embodiment.

As shown in FIG. 9, the battery management system 170 is disposed on the isolation plate 160 by using fixing members 171 such as bolts. The battery management system 170 is used to monitor states of the battery stack 110, such as voltages, currents, and temperatures. In addition, the battery management system 170 calculates the total capacity of the battery stack 110 and carries out a cell balancing operation to maintain the battery cells 110c at the same voltage level. In addition, the battery management system 170 prevents overcharging, overdischarging, and overcurrent of the battery stack 110.

In addition, the battery management system 170 may be connected to the sensing circuit board 150 through a flexible circuit board 172. An end of the flexible circuit board 172 may be coupled to the connector 152 of the sensing circuit board 150, and the other end of the flexible circuit board 172 may be electrically connected to the battery management system 170.

The battery management system 170 may include a plurality of connectors 173 for electric connection with other battery packs or external devices.

In this way, since the sensing circuit board 150 and the battery management system 170 are connected through the one-piece flexible circuit board 172, the connection structure can be simple and easily assembled.

Like the sensing circuit board 150, the battery management system 170 may be a circuit board having a plate shape.

Figure 10:
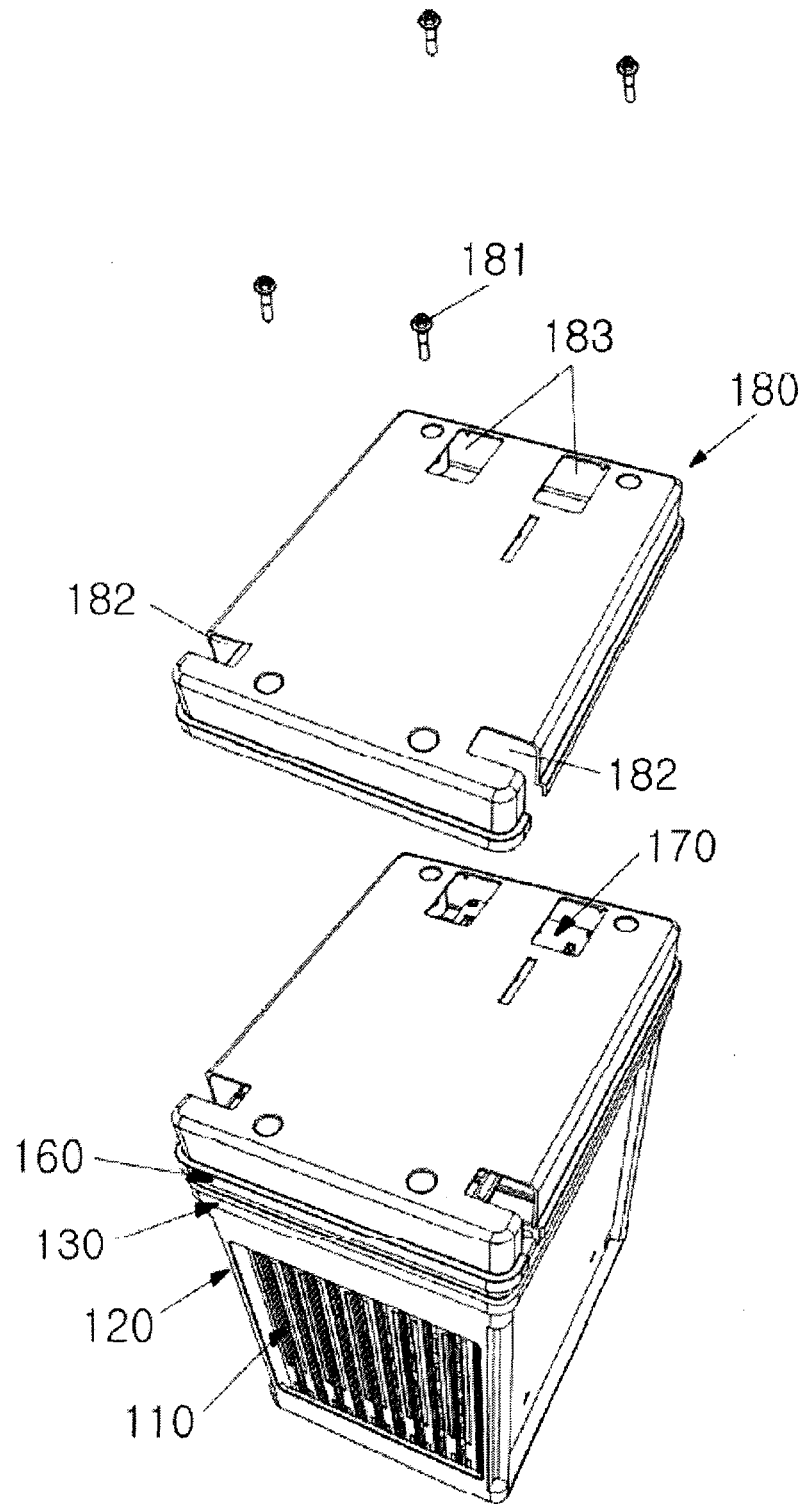
FIG. 10 is a perspective view for illustrating how a top cover is coupled to the isolation plate of the battery pack according to the embodiment.

FIG. 10 is a perspective view for illustrating how the top cover 180 is coupled to the isolation plate 160 of the battery pack 100 according to the embodiment.

As shown in FIG. 10, the top cover 180 may be coupled to the isolation plate 160 by using fixing members 181 such as bolts. The top cover 180 may include cut portions 182 at both lateral sides so that the terminals 136 of the middle cover 130 can be exposed. In addition, the top cover 180 may include other cut portions 183 so that the connectors 173 of the battery management system 170 can be exposed.

In this way, since the top cover 180 covers the sensing circuit board 150 and the battery management system 170, the sensing circuit board 150 can be safely isolated from outside environments. Since the terminals 136 and the connectors 173 are exposed through the top cover 180, the battery pack 100 can be easily connected to external devices.

Figure 11:
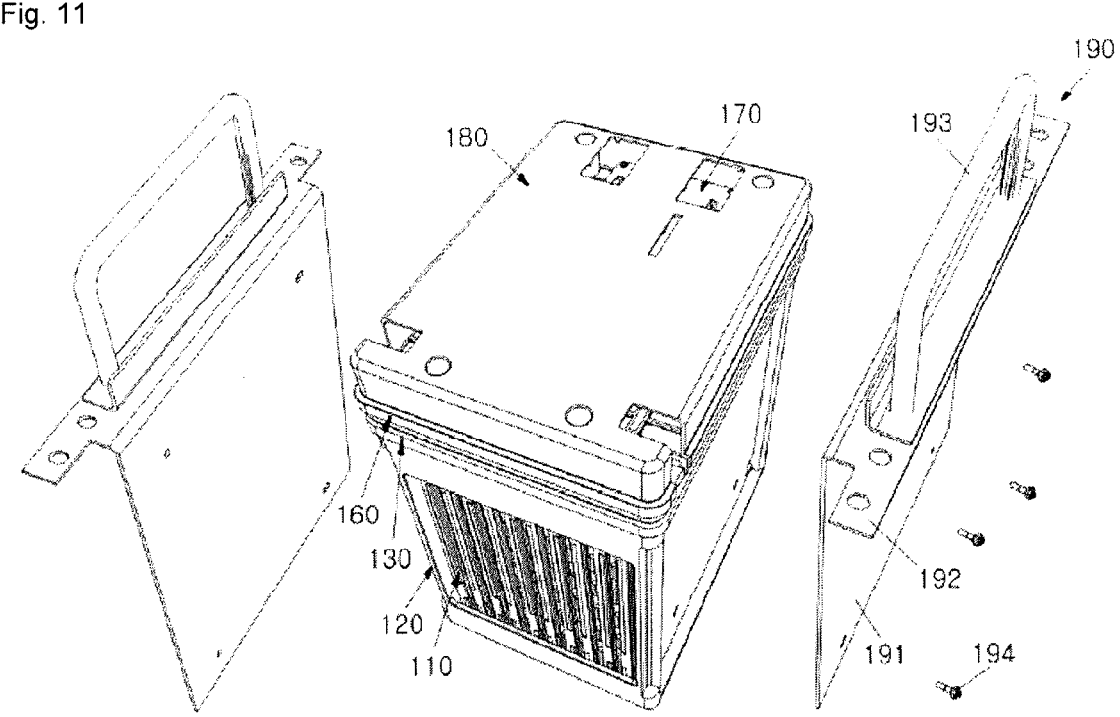
FIG. 11 is a perspective view for illustrating how handle parts are coupled to the housing of the battery pack according to the embodiment.

FIG. 11 is a perspective view for illustrating how the handle parts 190 are coupled to the housing 120 of the battery pack 100 according to the embodiment.

As shown in FIG. 11, the handle parts 190 may be coupled to both lateral sides of the housing 120. Then, a user may easily carry the battery pack 100 by holding the handle parts 190. Each of the handle parts 190 includes a planar part 191 configured to be attached to a lateral side of the housing 120, a bent part 192 outwardly bent from the planar part 191, and a handle 193 coupled to the bent part 192 and extending upward above the topside of the housing 120. The planar part 191 is coupled to the housing 120 by using fixing members 194 such as bolts, and the bent part 192 is brought into contact with the flange 122f of the housing 120.

Thus, a user may easily carry the battery pack 100 by using the handle parts 190. If the planar part 191 is made of a metal, heat generated in the battery pack 100 may be easily dissipated to the outside of the battery pack 100.

Exemplary embodiments of a battery pack have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack comprising:
a housing having an opening;
a plurality of batteries mounted within the housing so that an upper surface of the plurality of batteries are positioned proximate the opening, wherein each of the plurality of batteries include at least one tab positioned adjacent the upper surface of the battery and wherein the batteries are arranged in a first and second columns of batteries;
a cover that is positioned on the housing so as to be adjacent the opening wherein the cover has a plurality of penetration openings;
a plurality of bus bars electrically coupled to the at least one tab of the batteries so as to connect the tabs of at least two aligned batteries that extend through penetration openings in the cover, wherein the plurality of bus bars have an upper surface that is substantially planar and include a tab that has an upper surface that is substantially planar with the upper surface of the bus bar that extends in a first direction from the tabs of the at least two aligned batteries in the first column and in a second direction opposite the first direction in the second column such that the tabs of the first column extend toward the tabs in the second column in a space between the first and second columns;
a sensing circuit board that has a planar upper surface and a planar lower surface disposed on the plurality of bus bars so that the sensing circuit board receives electrical signals from each of the plurality of batteries wherein the sensing board is mounted on the tabs of the plurality of bus bars of the first and second columns of batteries and is positioned in the space between the first and second columns so that the planar lower surface is positioned on the planar upper surface of the tab and is secured thereto via fasteners that extend through the sensing circuit board and the tabs and so that the plurality of bus bars are not covered by the sensing circuit board,
wherein the cover includes a plurality of supports so that the at least one tab of the batteries is positioned on the supports, the plurality of bus bars have "∩" shape so as to enclose each of the plurality of supports and the at least one tab of the batteries.

2. The battery pack of claim 1, further comprising an isolation plate that is positioned on the cover wherein the isolation plate covers at least some of the bus bars to electrically insulate at least some of the bus bars.

3. The battery pack of claim 2, further comprising a battery management system disposed on the isolation plate and electrically connected to the sensing circuit board.

4. The battery pack of claim 1, wherein the housing is rectangular in shape defining a four sided receptacle and wherein the plurality of batteries are planar in shape and are arranged in the four sided receptacle so as to extend substantially parallel to each other between a first and a second side of the housing.

5. The battery pack of claim 4, wherein the first and the second side of the housing includes an air flow opening so as to allow air to flow between the substantially parallel arranged the plurality of batteries.

6. The battery pack of claim 4, wherein at least two of the sides of the housing extending substantially parallel to the plurality of substantially parallel planar batteries include fixing openings, wherein each of the plurality of batteries include fixing openings, and wherein the fixing openings of the housing and the batteries are aligned so as to receive at least one fixing rod to retain the plurality of batteries in the housing.

7. The battery pack of claim 1, wherein the plurality of batteries include a substantially planar battery cell, a heat shield mounted adjacent a first side of the substantially planar battery cell, and first and second frame members mounted so that the substantially planar battery cell and the heat shield are interposed between the first and second frame members.

8. The battery pack of claim 1, wherein the at least one tab on each of the plurality of batteries comprises a first and a second tab that extend in a first and a second direction and wherein the plurality of batteries are arranged in the housing so that at least one of the first tabs and the second tabs of adjacent batteries overlap adjacent at least one of the plurality of supports.

9. The battery pack of claim 1, wherein the at least one tabs, the plurality of bus bars and the supports are arranged in two parallel columns separated by a center section of the cover.

10. The battery pack of claim 9, wherein the plurality of bus bars extend into the center section of the cover and wherein the sensing circuit board is mounted in the center section of the cover.

11. The battery pack of claim 10, wherein a penetration opening of the cover is formed in the center section of the cover.

12. The battery pack of claim 10, further comprising an isolation plate that is positioned on the cover wherein the isolation plate covers at least some of the bus bars to electrically insulate at least some of the bus bars and wherein the isolation plate includes protrusions that extend into the plurality of penetration holes of the cover.

13. The battery pack of claim 1, wherein the battery pack further comprises two terminals that are adjacent the opening of the housing and wherein the battery pack further comprises a top cover that is positioned over the housing so as to cover the battery pack while leaving the electrodes exposed.

14. The battery pack of claim 1, further comprising at least one handle part connected to the housing so as to permit lifting of the battery pack via the at least one handle part.

15. The battery pack of claim 1, wherein at least one support comprises a metal bush configured to receive a fixing member to couple the support to at least one bus bar and at least one tab.

16. The battery pack of claim 1, wherein the sensing circuit board comprises a conductive pattern formed on a surface of the sensing circuit board facing the bus bar to electrically connect the bus bar to the sensing circuit board.

* * * * *